(12) United States Patent
Geddes et al.

(10) Patent No.: US 6,722,271 B1
(45) Date of Patent: Apr. 20, 2004

(54) CERAMIC DECAL ASSEMBLY

(75) Inventors: Pamela A. Geddes, Alden, NY (US); Barry J. Briggs, Kelowna (CA); Daniel J. Harrison, Pittsford, NY (US)

(73) Assignee: International Imaging Materials Inc., Amherst, NY (US)

( * ) Notice: Subject to any disclaimer, the term of this patent is extended or adjusted under 35 U.S.C. 154(b) by 125 days.

(21) Appl. No.: 10/080,783

(22) Filed: Feb. 22, 2002

Related U.S. Application Data

(63) Continuation-in-part of application No. 09/961,493, filed on Sep. 22, 2001, which is a continuation-in-part of application No. 09/702,415, filed on Oct. 31, 2000, now Pat. No. 6,481,353.

(51) Int. Cl.$^7$ ................................................ B41D 7/00
(52) U.S. Cl. ............................ 101/33; 101/34; 101/488
(58) Field of Search .......................... 101/33, 34, 483, 101/487, 488, 491, 492; 156/89.11, 230, 233, 237, 277; 427/145, 147, 148, 149; 428/914

(56) References Cited

U.S. PATENT DOCUMENTS 5,132,165 A  7/1992  Blanco
5,665,472 A  9/1997  Tanaka et al.

*Primary Examiner*—Ren Yan
(74) *Attorney, Agent, or Firm*—Howard J. Greenwald

(57) ABSTRACT

A ceramic decal assembly containing a ceramic substrate, a layer of adhesive contiguous with the substrate, and a ceramic decal contiguous with the layer of adhesive.

19 Claims, 31 Drawing Sheets

CERAMIC DECAL ASSEMBLY

CROSS-REFERENCE TO RELATED PATENT APPLICATION

This application is a continuation-in-part of patent application Ser. No. 09/961,493, filed on Sep. 22, 2001, which in turn was a continuation-in-part of patent application U.S. Ser. No. 09/702,415, filed on Oct. 31, 2000, now U.S. Pat. No. 6,481,353.

FIELD OF THE INVENTION

A ceramic decal assembly containing a ceramic substrate, a layer of adhesive contiguous with the substrate, and a ceramic decal contiguous with the layer of adhesive.

BACKGROUND OF THE INVENTION

Processes for preparing "decals" are well known. Thus, e.g., in U.S. Pat. No. 5,132,165 of Louis A. Blanco, a wet printing technique was described comprising the step of offset printing a first flux layer onto a backing sheet, forming a wet ink formulation free of glass and including a liquid printing vehicle and oxide coloring agent, wet printing the wet ink formulation onto the first flux layer to form a design layer, and depositing a second flux layer onto the design layer.

The process described by this Blanco patent is not readily adaptable to processes involving digital imaging, for the wet inks of this patent are generally too viscous for ink jet printing and not suitably thermoplastic for thermal transfer or electrophotographic printing.

Digital printing methodologies offer a more convenient and lower cost method of mass customization of ceramic articles than do conventional analog printing methodologies, but they cannot be effectively utilized by the process of the Blanco patent.

The Blanco patent issued in July of 1992. In September of 1997, U.S. Pat. No. 5,665,472 issued to Konsuke Tanaka. This patent described a dry printing process that overcame some of the disadvantages of the Blanco process. The ink formulations described in the Tanaka patent are dry and are suitable to processes involving digital imaging.

However, although the Tanaka process is an improvement over the Blanco process, it still suffers from several major disadvantages, which are described below.

The Tanaka patent discloses a thermal transfer sheet which allegedly can ". . . cope with color printing . . . " According to Tanaka, ". . . thermal transfer sheets for multi-color printing also fall within the scope of the invention" (see Column 4, lines 64–67). However, applicants have discovered that, when the Tanaka process is used to prepare digitally printed backing sheets for multi-coloring printing on ceramic substrates, unacceptable results are obtained.

The Tanaka process requires the presence of two "essential components" in a specified glass frit (see lines 4–12 of Column 4). According to claim 1 of U.S. Pat. No. 5,665,472, the specified glass frit consists essentially of 75 to 85 weight percent of $Bi_2O_3$ and 12 to 18 weight percent of $B_2O_3$, which are taught to be the "essential components" referred to by Tanaka. In the system of this patent, the glass frit and colorant particles are dispersed in the same ink. It is taught that, in order to obtain good dispersibility in this ink formulation, the average particle size of the dispersed particles should be from about 0.1 to about 10 microns (see Column 4 of the patent, at lines 13–17).

In the example presented in the Tanaka patent (at Column 7 thereof), a temperature of 450 degrees Celsius was used to fire images printed directly from thermal transfer sheets made in accordance with the Tanaka process to a label comprised of inorganic fiber cloth coated with some unspecified ceramic material.

When one attempts to use the process of the Tanaka patent to transfer images from a backing sheet to solid ceramic substrates (such as glass, porcelain, ceramic whitewares, etc.), one must use a temperature in excess of 550 degrees Celsius to effectively transfer an image which is durable. However, when such a transfer temperature is used with the Tanaka process, a poor image comprised with a multiplicity of surface imperfections (such as bubbles, cracks, voids, etc.) is formed. Furthermore, when the Tanaka process is used to attempt to transfer color images, a poor image with low color density and poor durability is formed. The Tanaka process, although it may be useful for printing on flexible ceramic substrates such as glass cloth, is not useful for printing color images on most solid ceramic substrates.

It is an object of this invention to provide a ceramic decal assembly which, after being fired, produces durable images on a ceramic substrate.

SUMMARY OF THE INVENTION

In accordance with this invention, there is provided a ceramic decal assembly containing a ceramic substrate, a layer of adhesive contiguous with the substrate, and a ceramic decal contiguous with the layer of adhesive.

BRIEF DESCRIPTION OF THE DRAWINGS

The invention will be described by reference to this specification and the attached drawings, in which like numerals refer to like elements, and in which.

Figure 1:
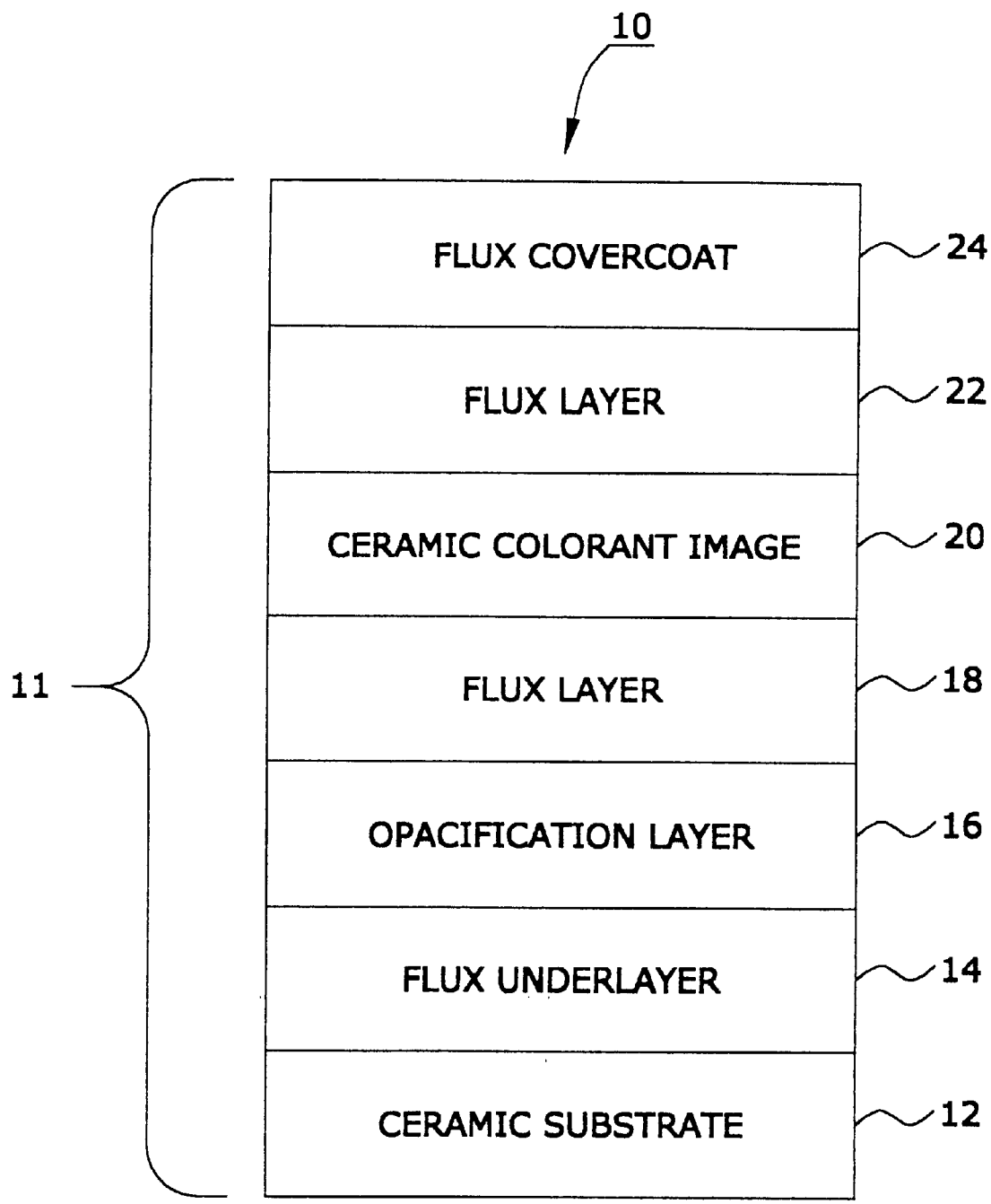
FIG. 1 is a schematic representation of a ceramic substrate to which a color image has been transferred in accordance with the invention.
Figure 6:
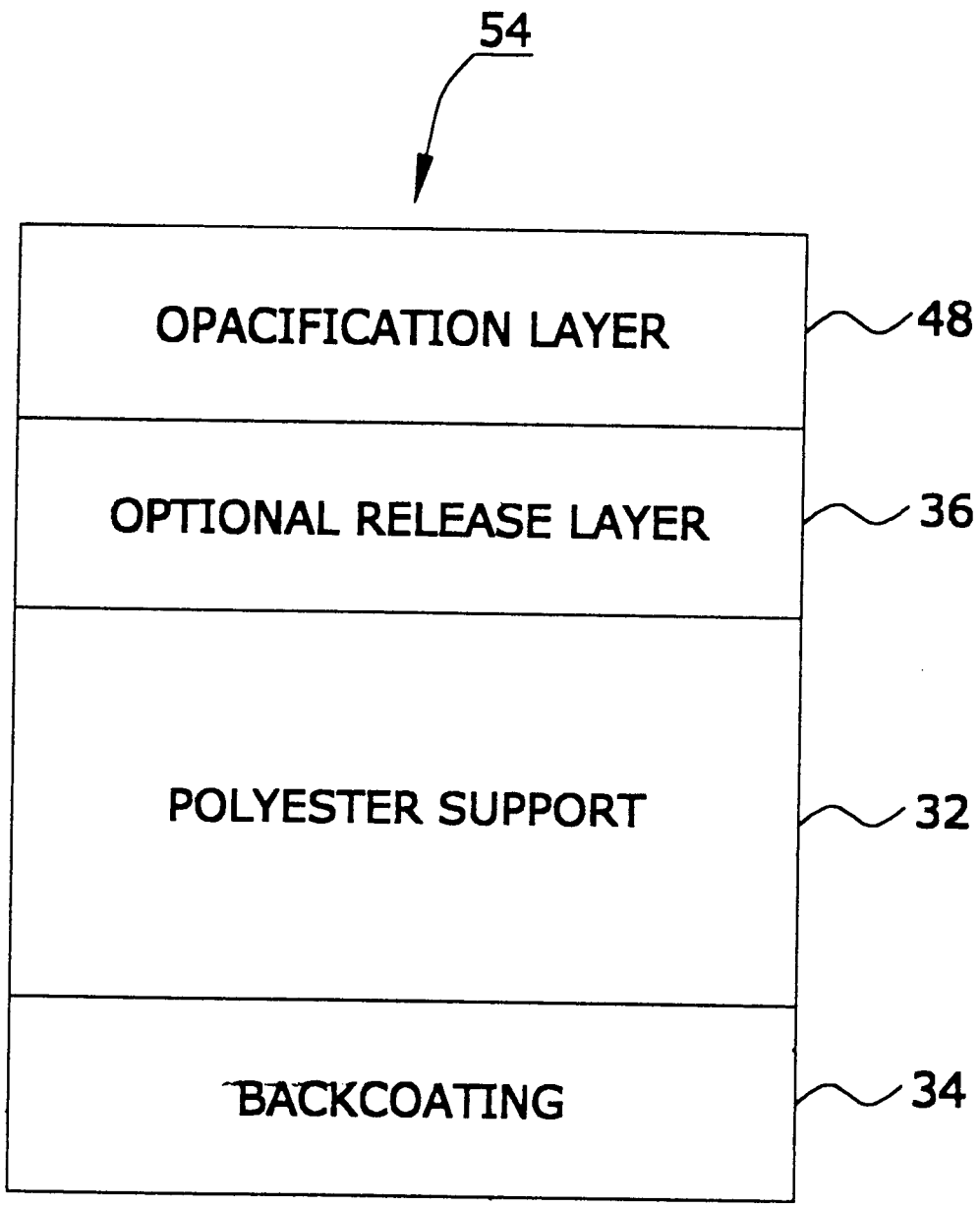
Figure 6A:
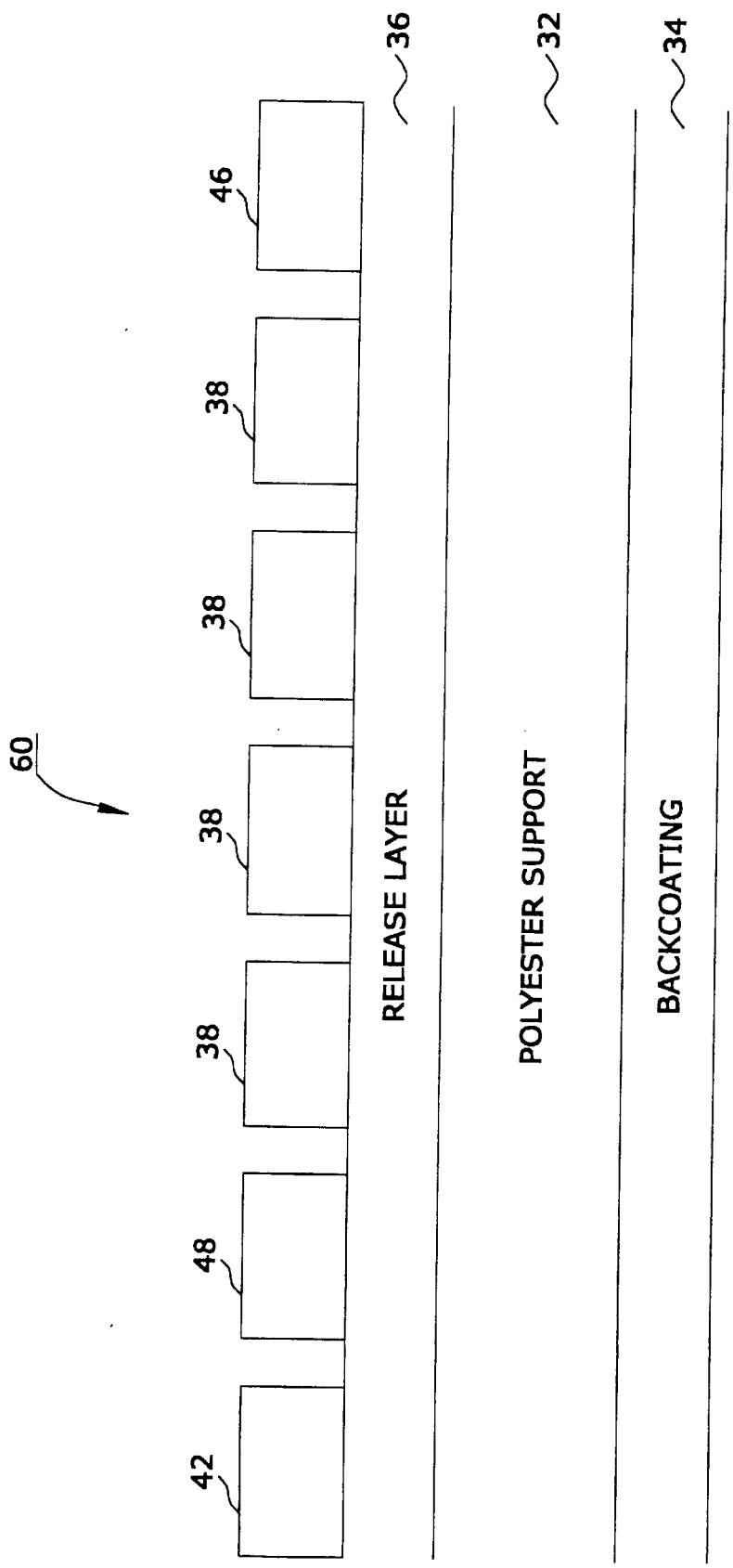
Figure 7:
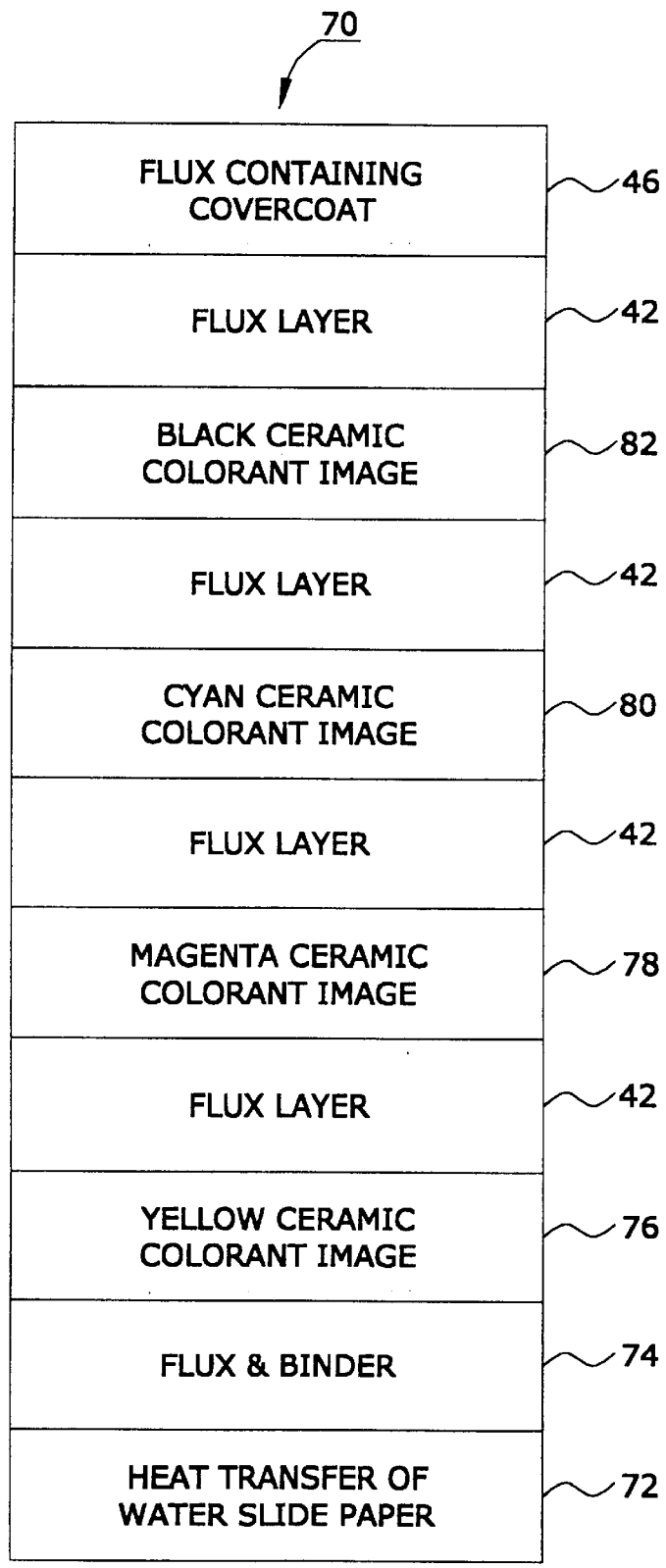
Figure 8:
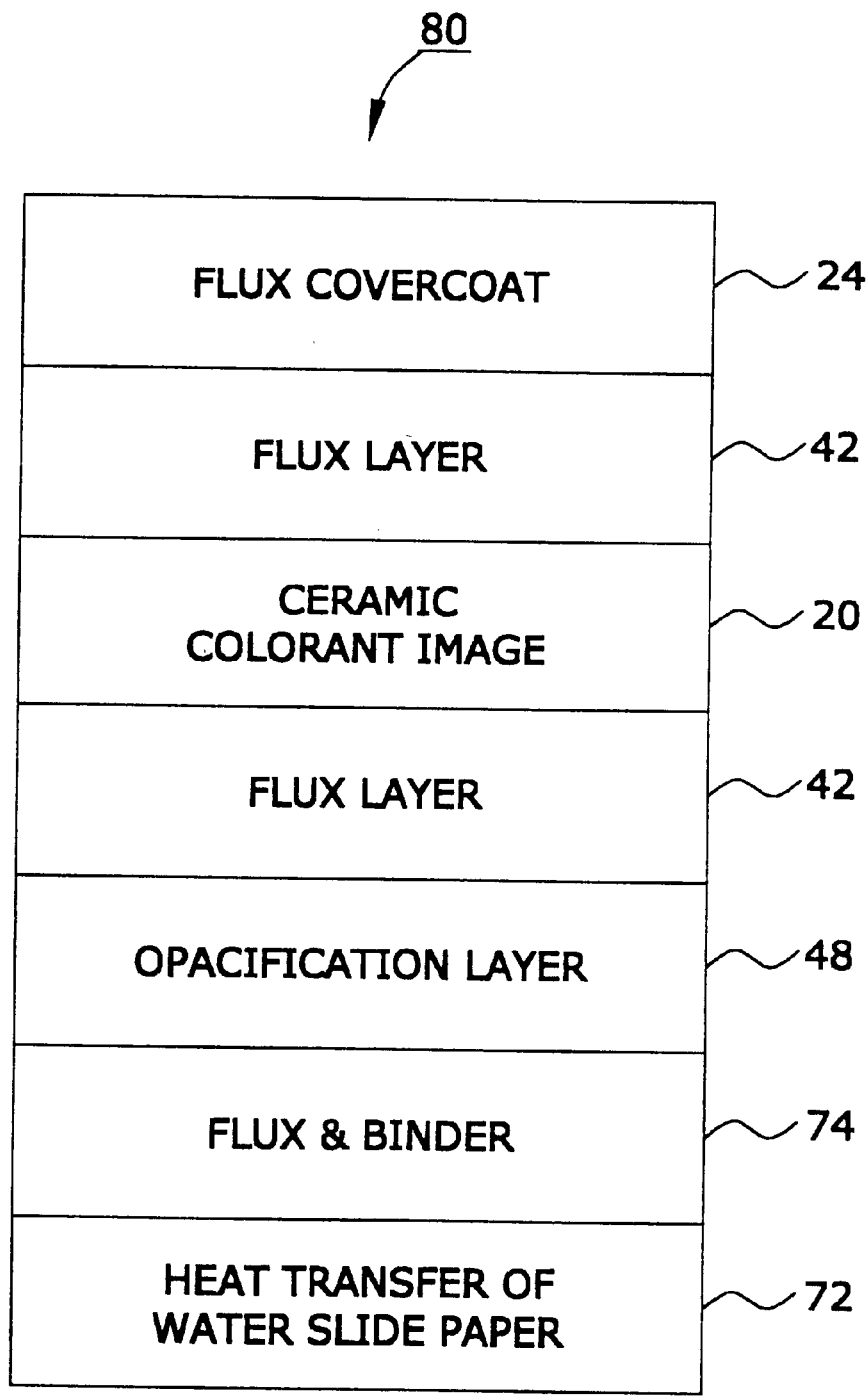
Figure 12:
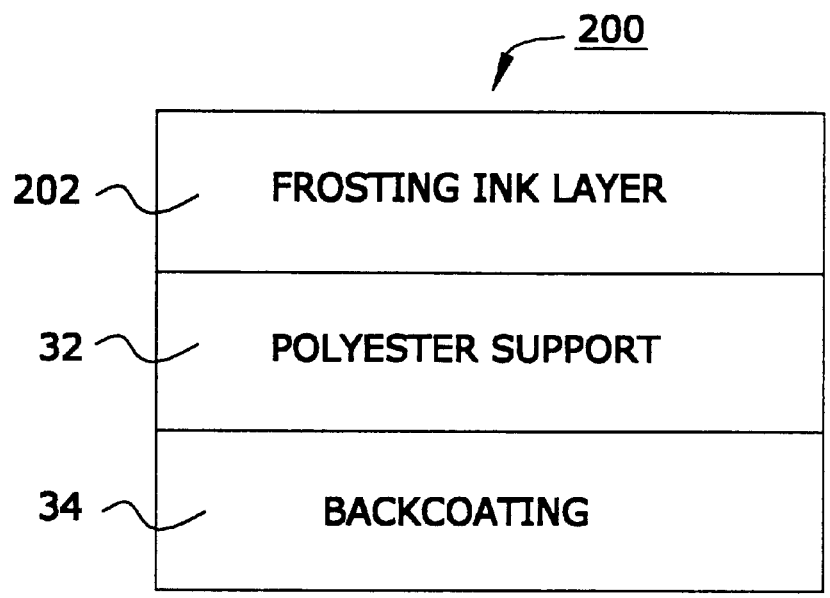
Figure 13:
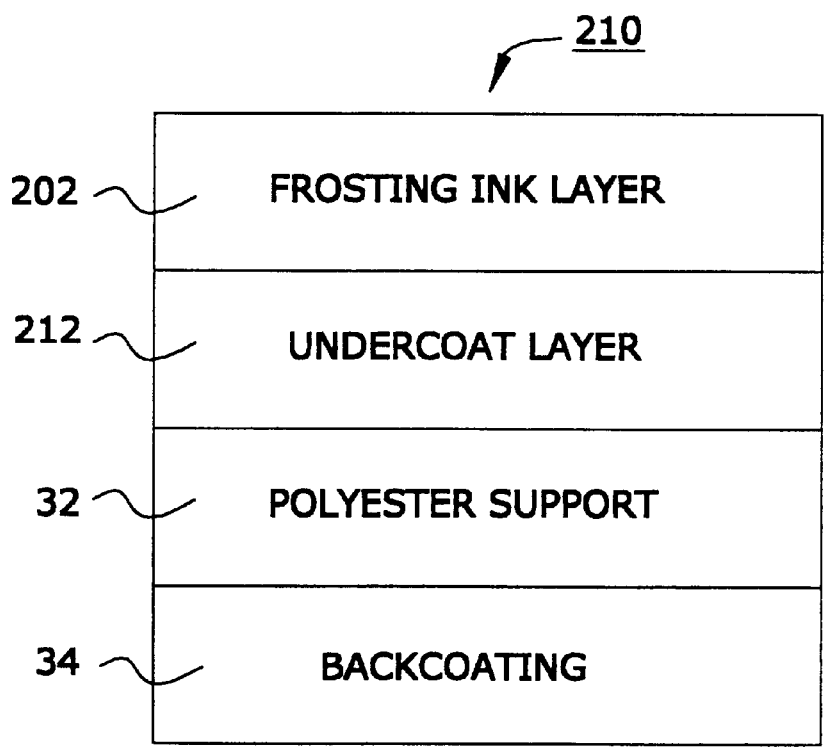
Figure 13B:
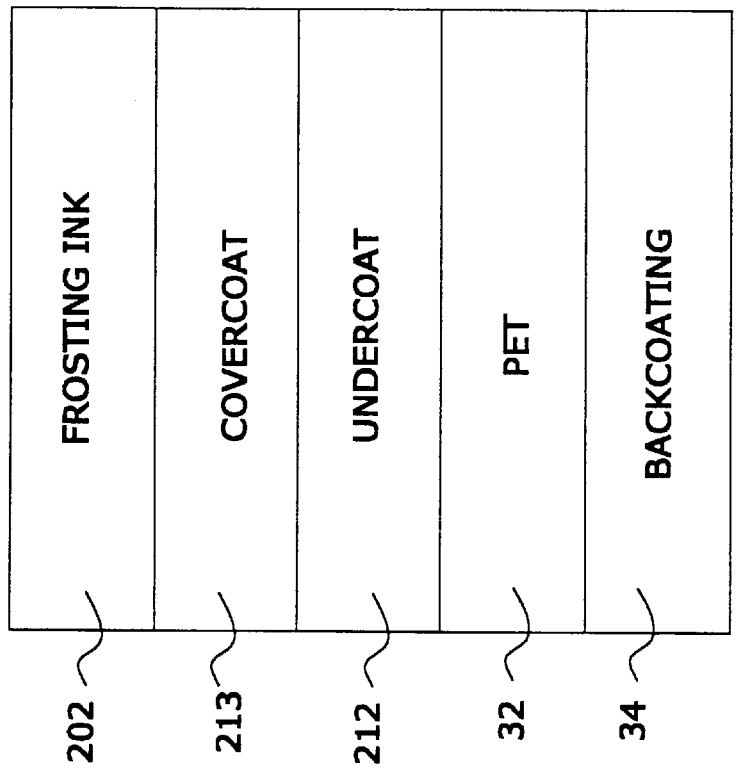
Figure 13A:
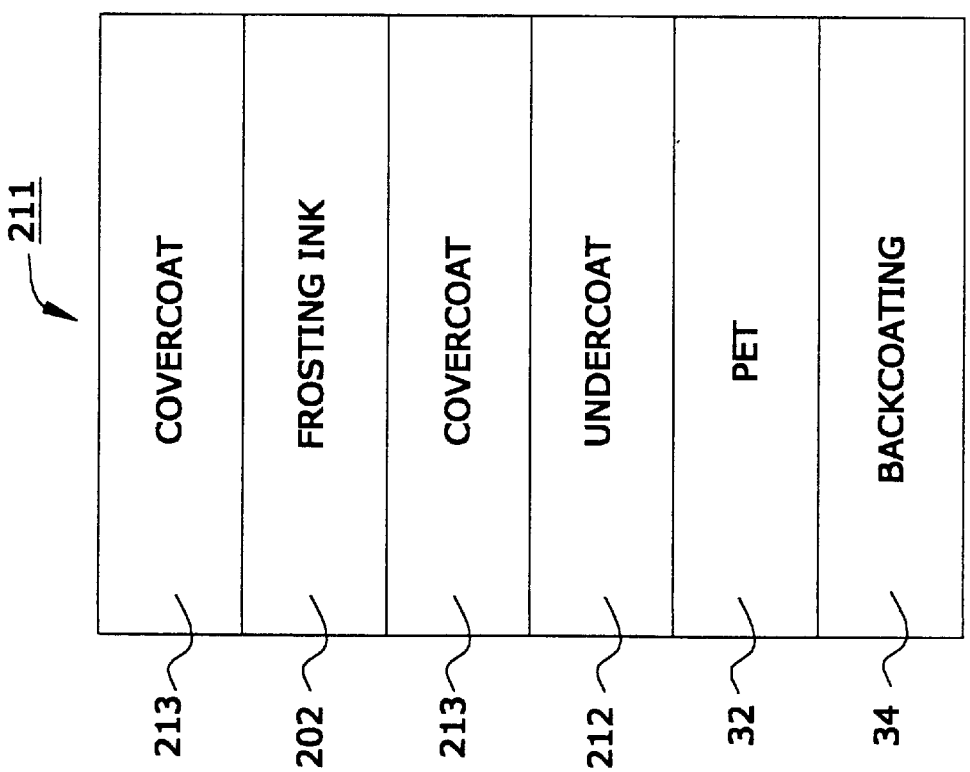
Figure 14:
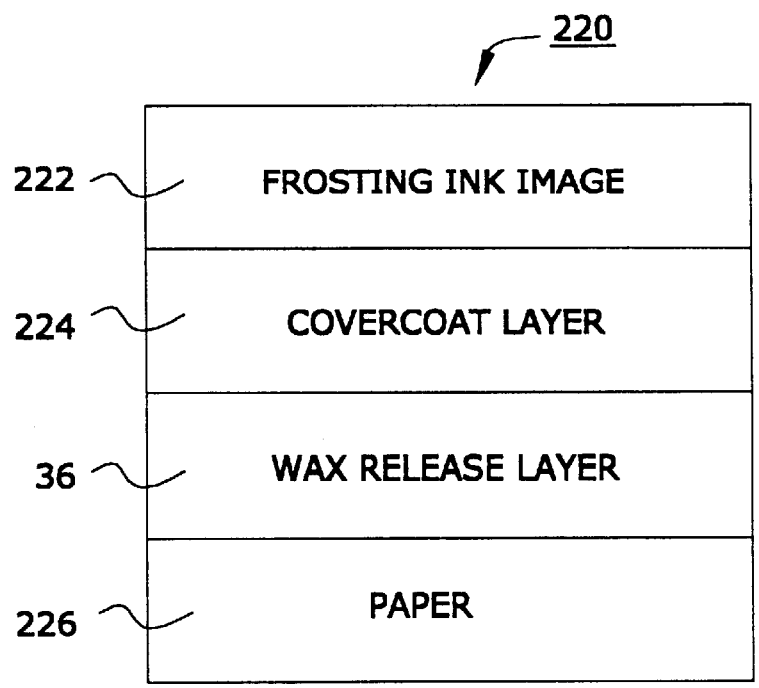
Figure 15:
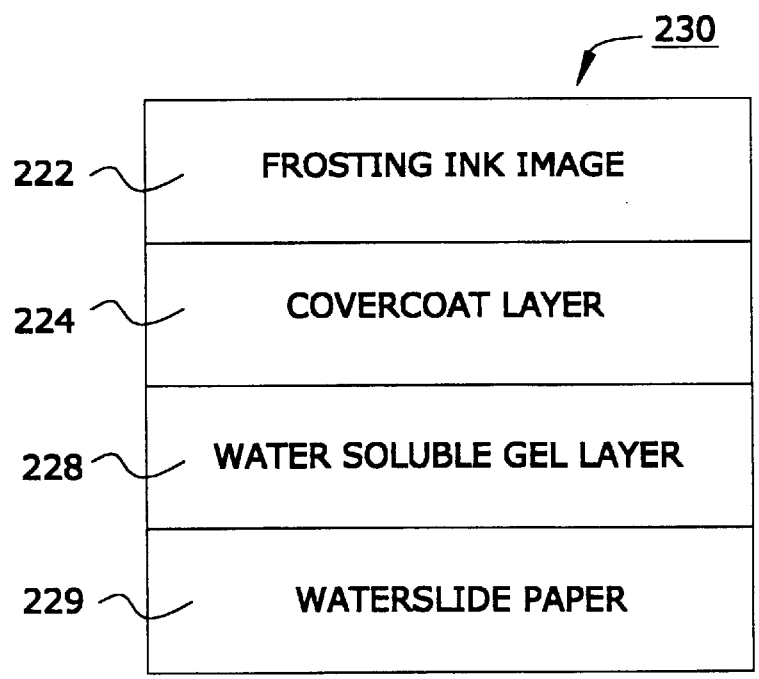
Figure 16:
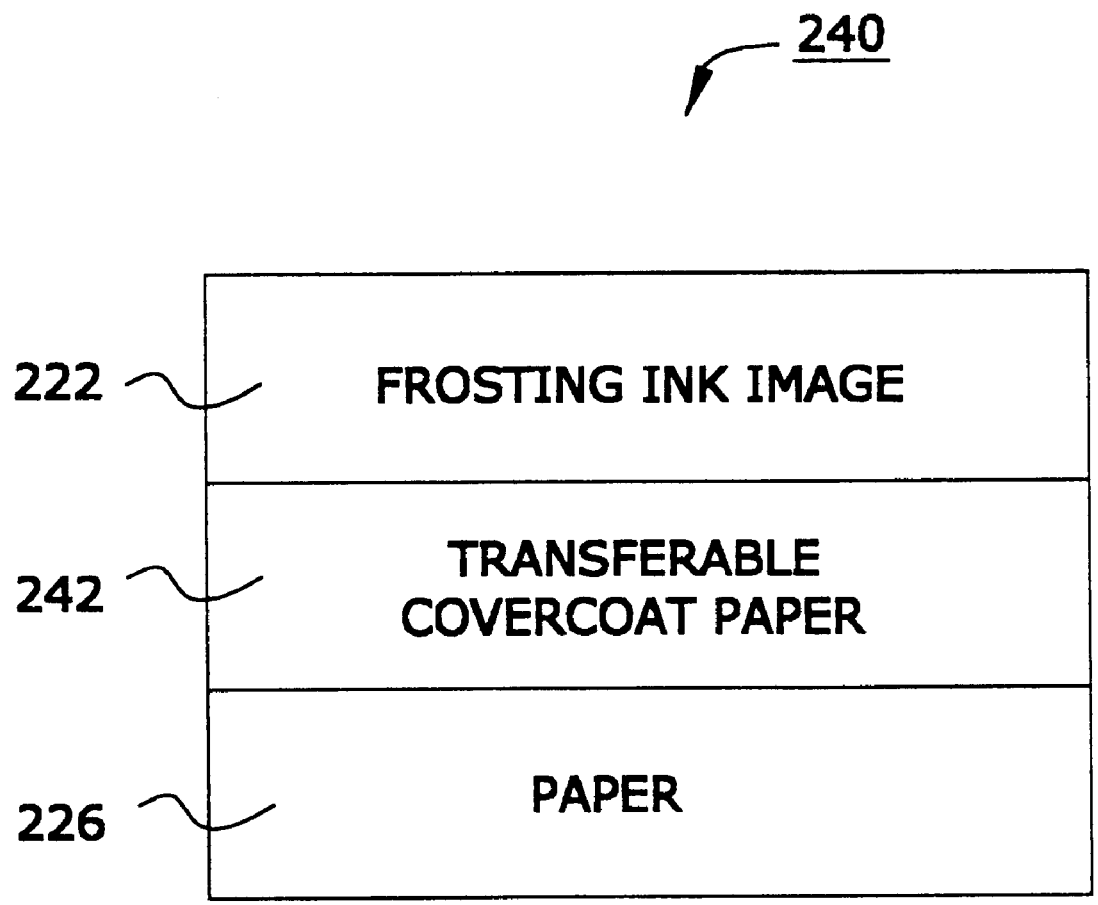
Figure 17:
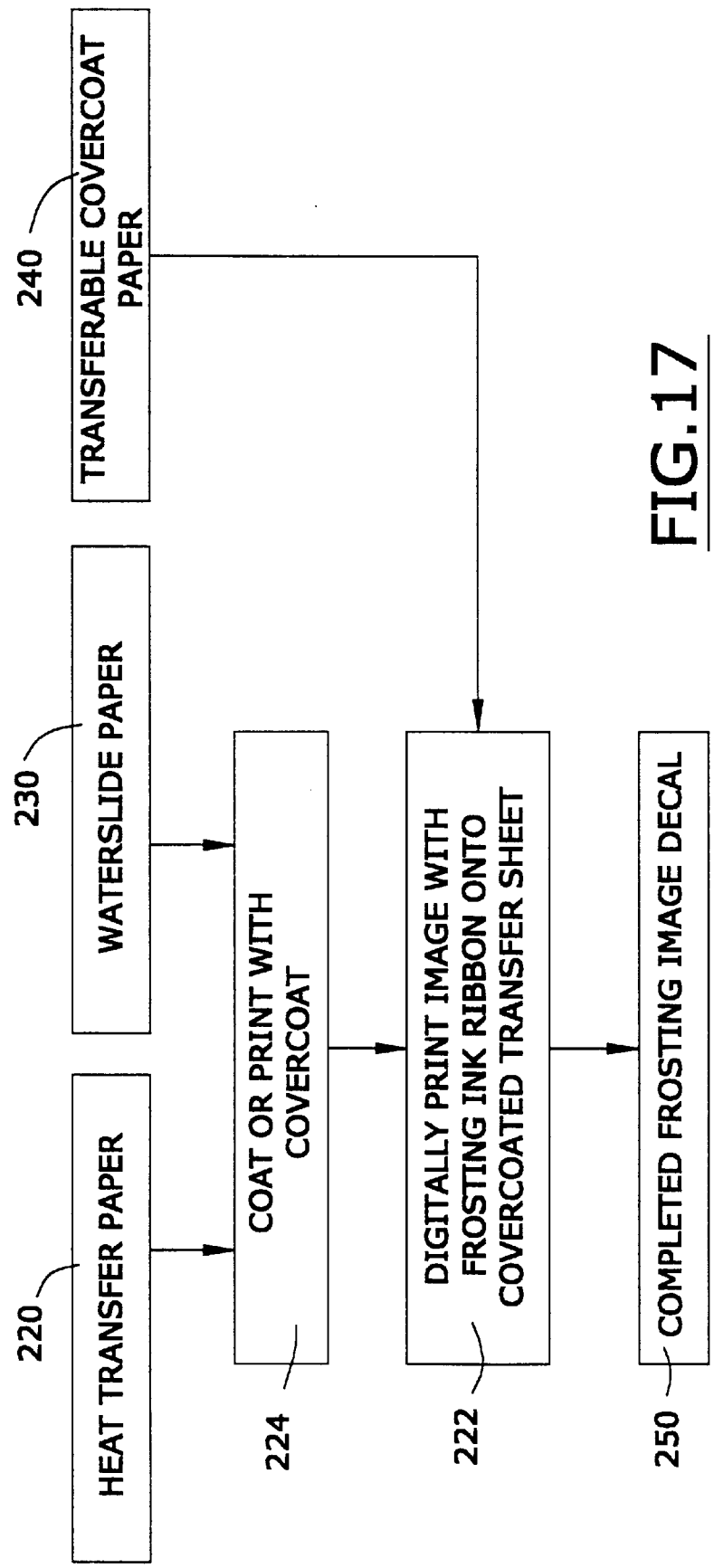
Figure 18:
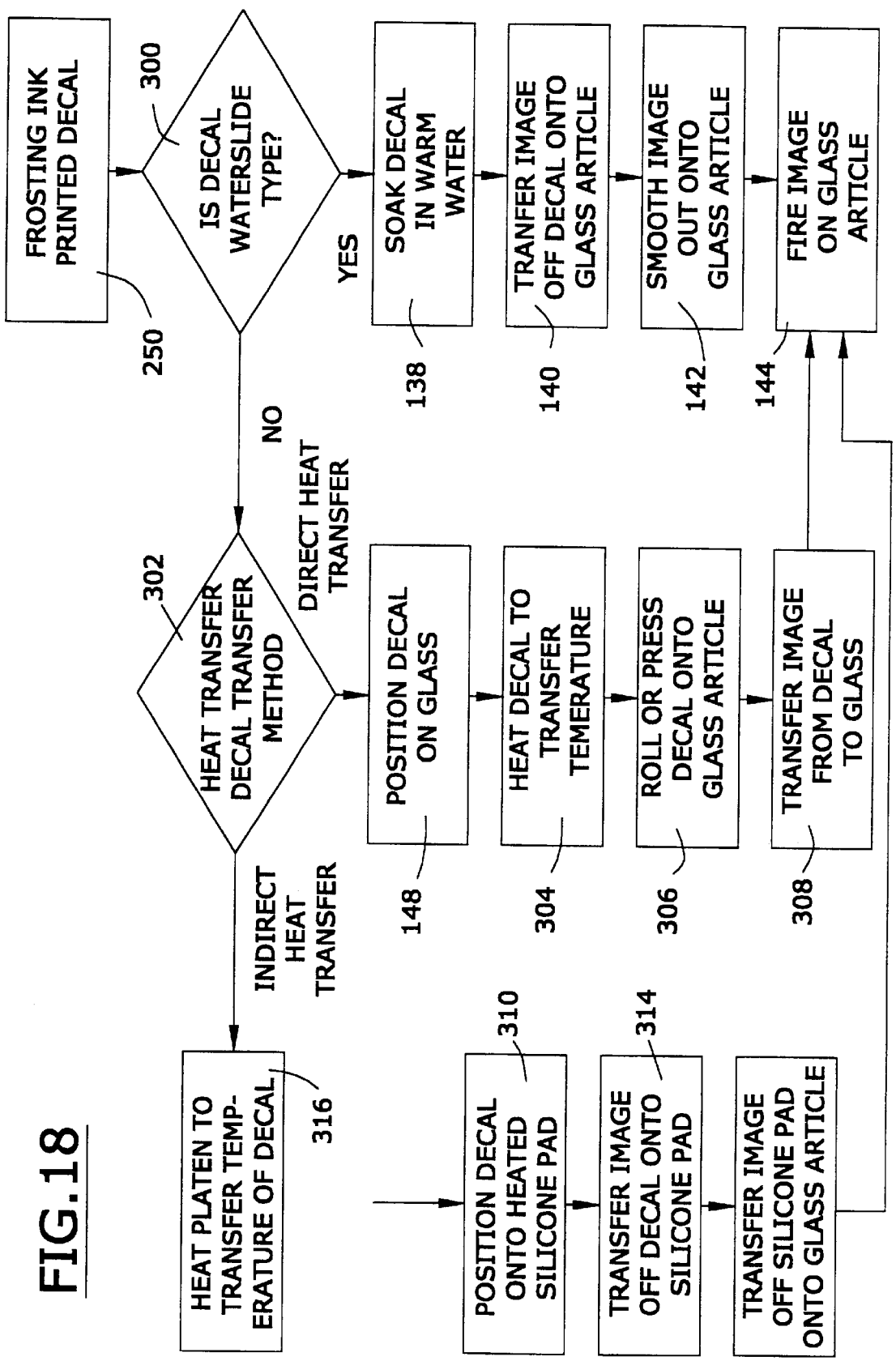
Figure 19:
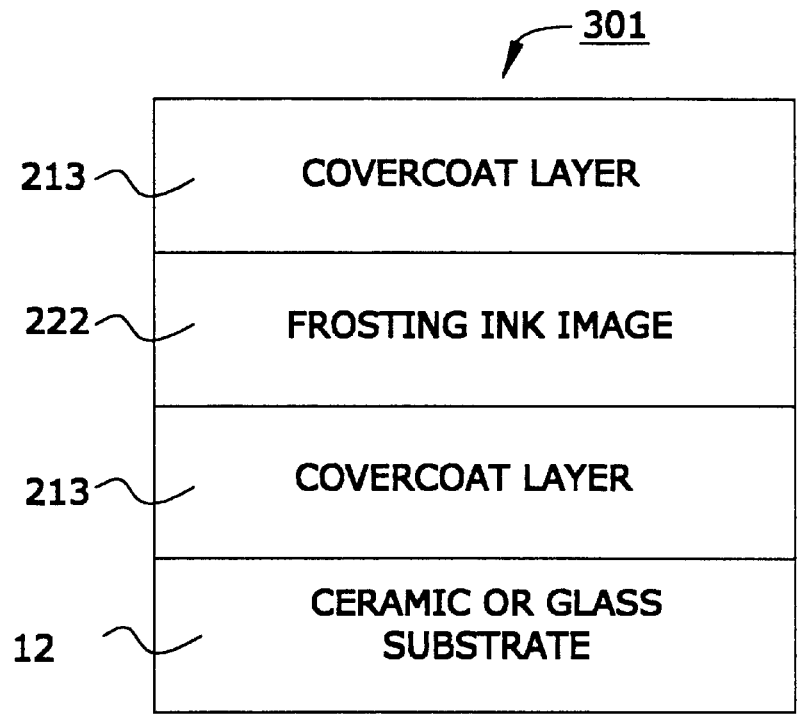
Figure 20:
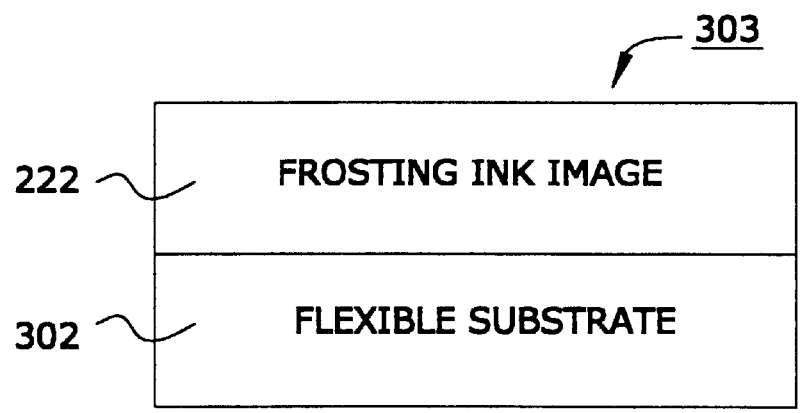
Figure 21:
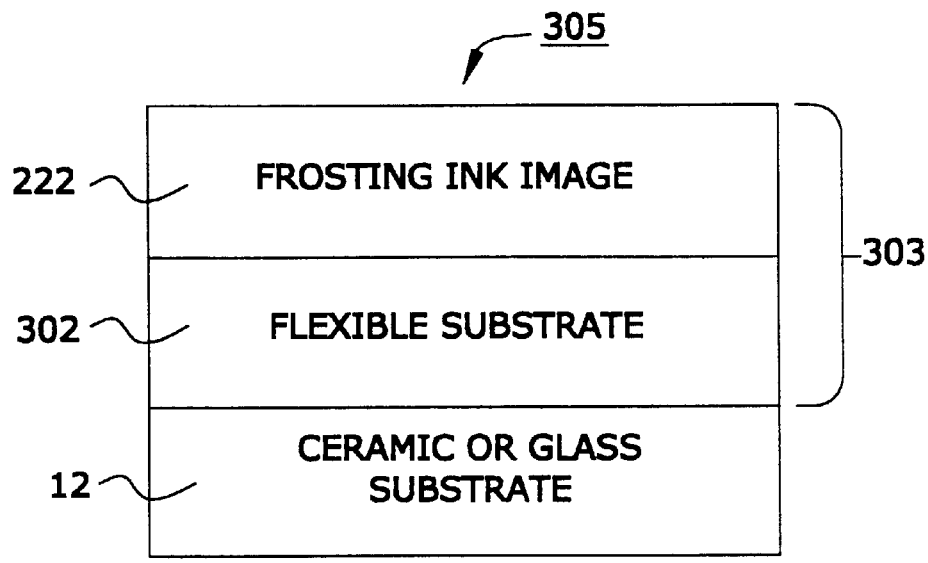
Figure 22:
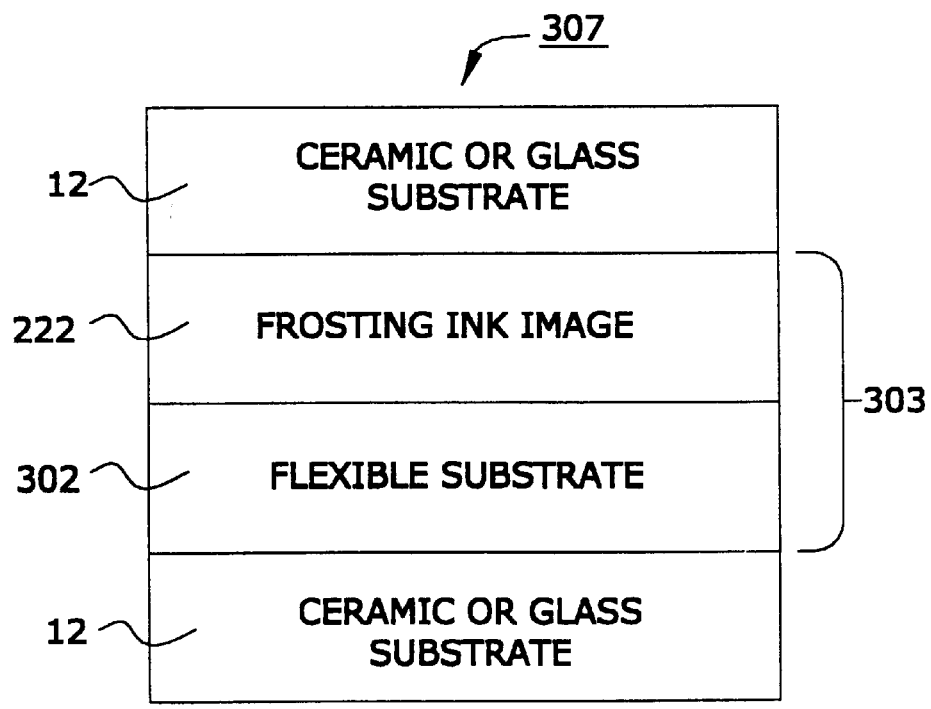
Figure 23:
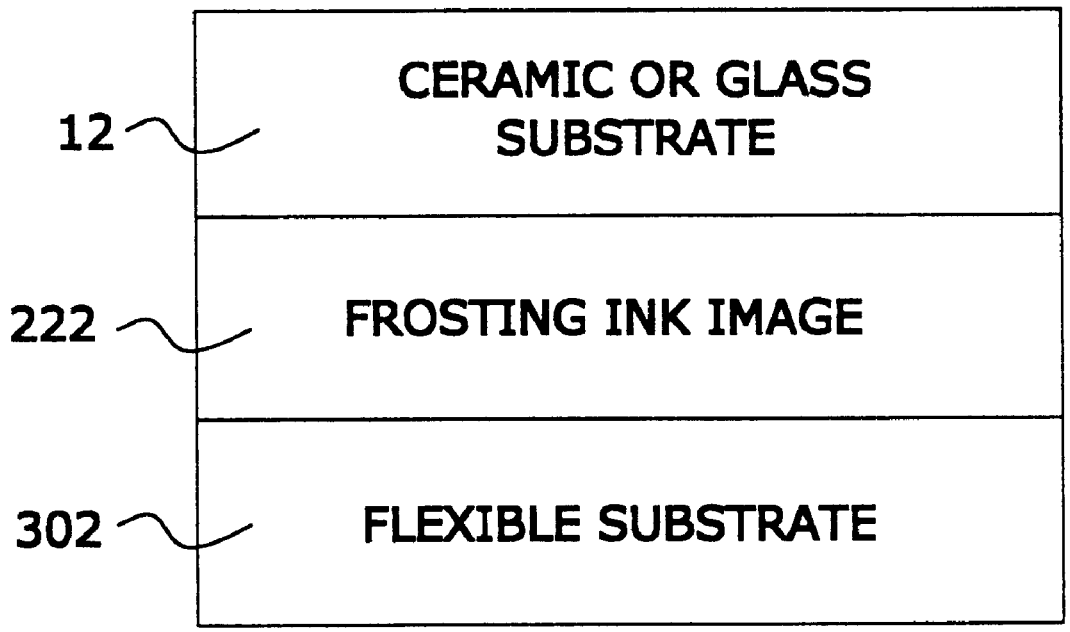
Figure 24:
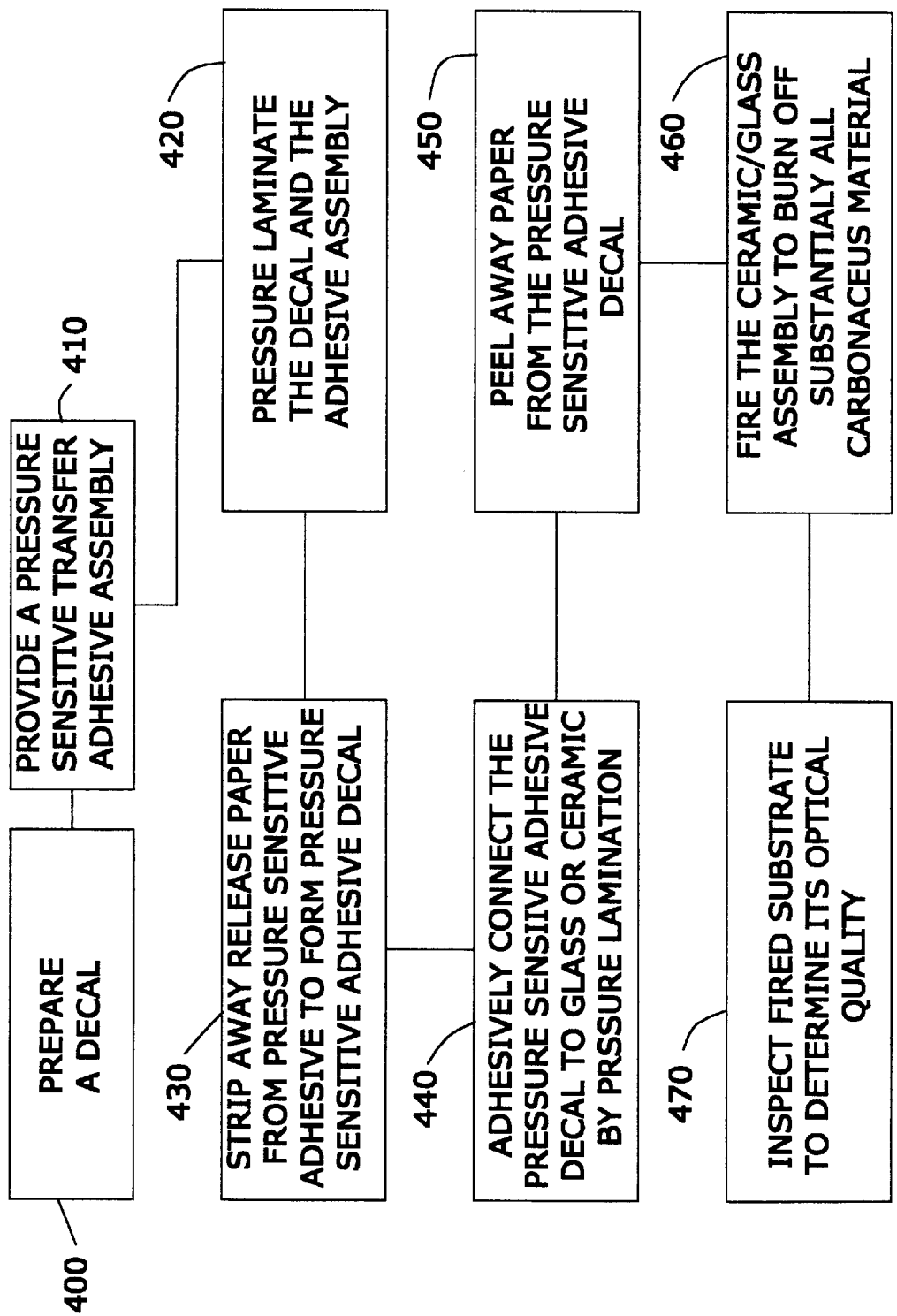
Figures 25A, 25B:
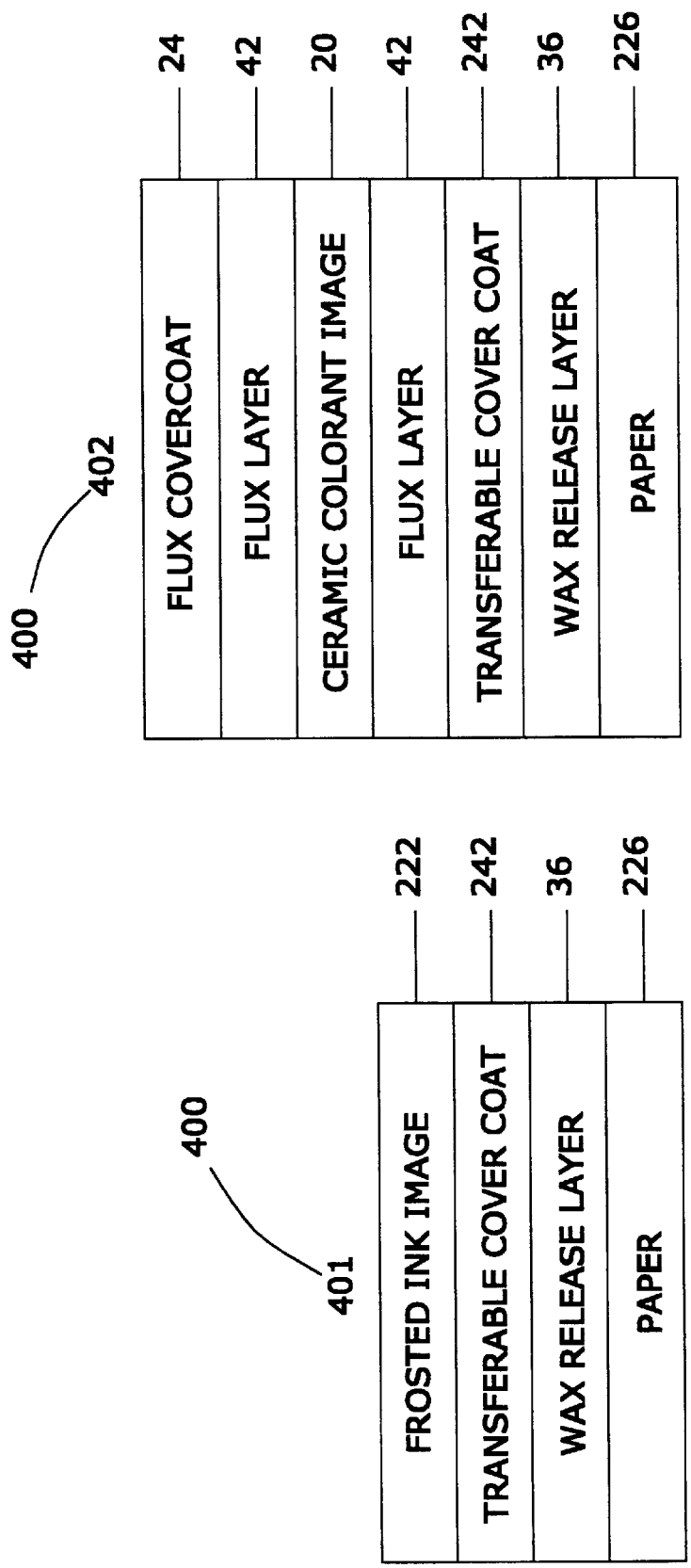
Figure 26:
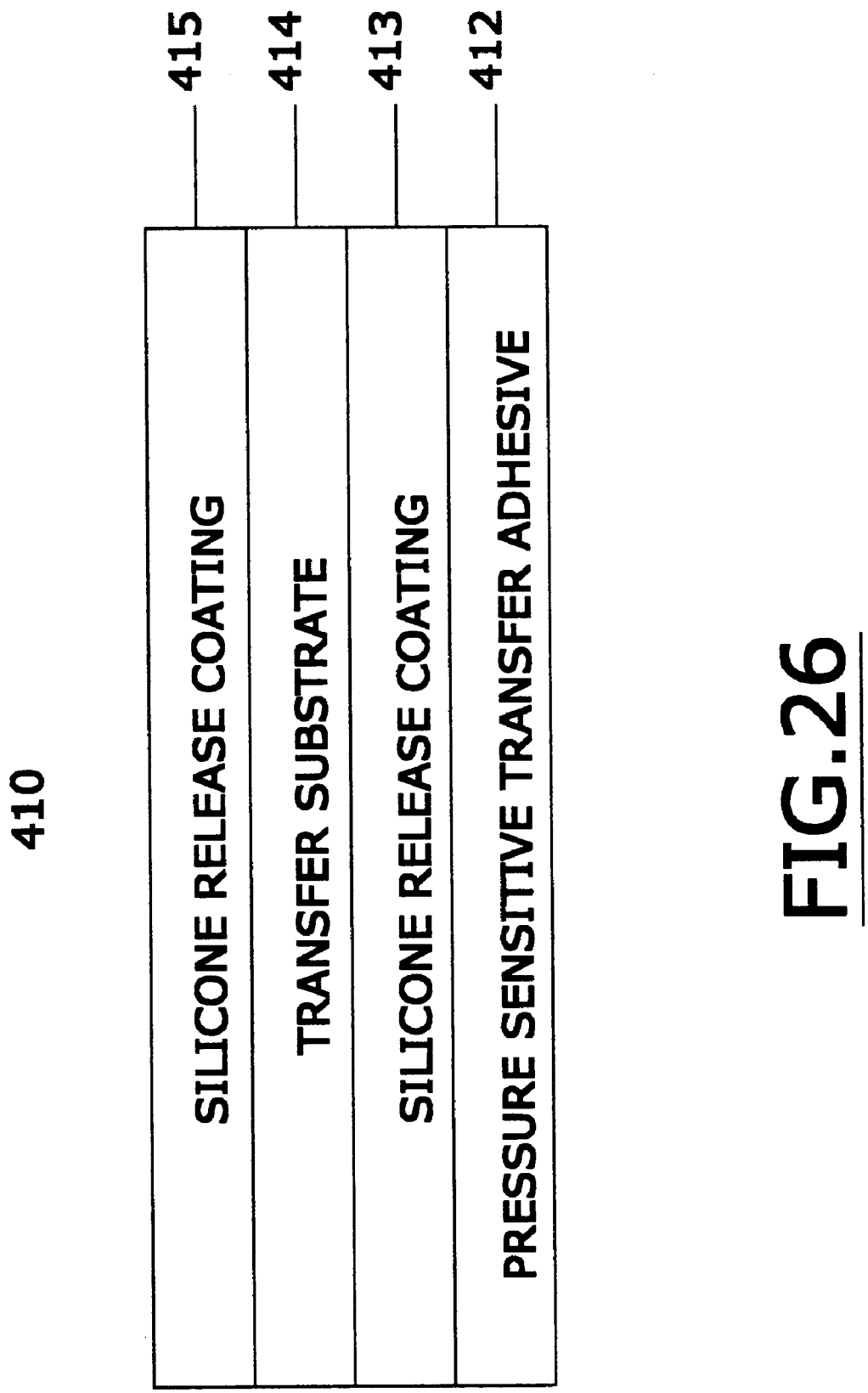
Figure 27:
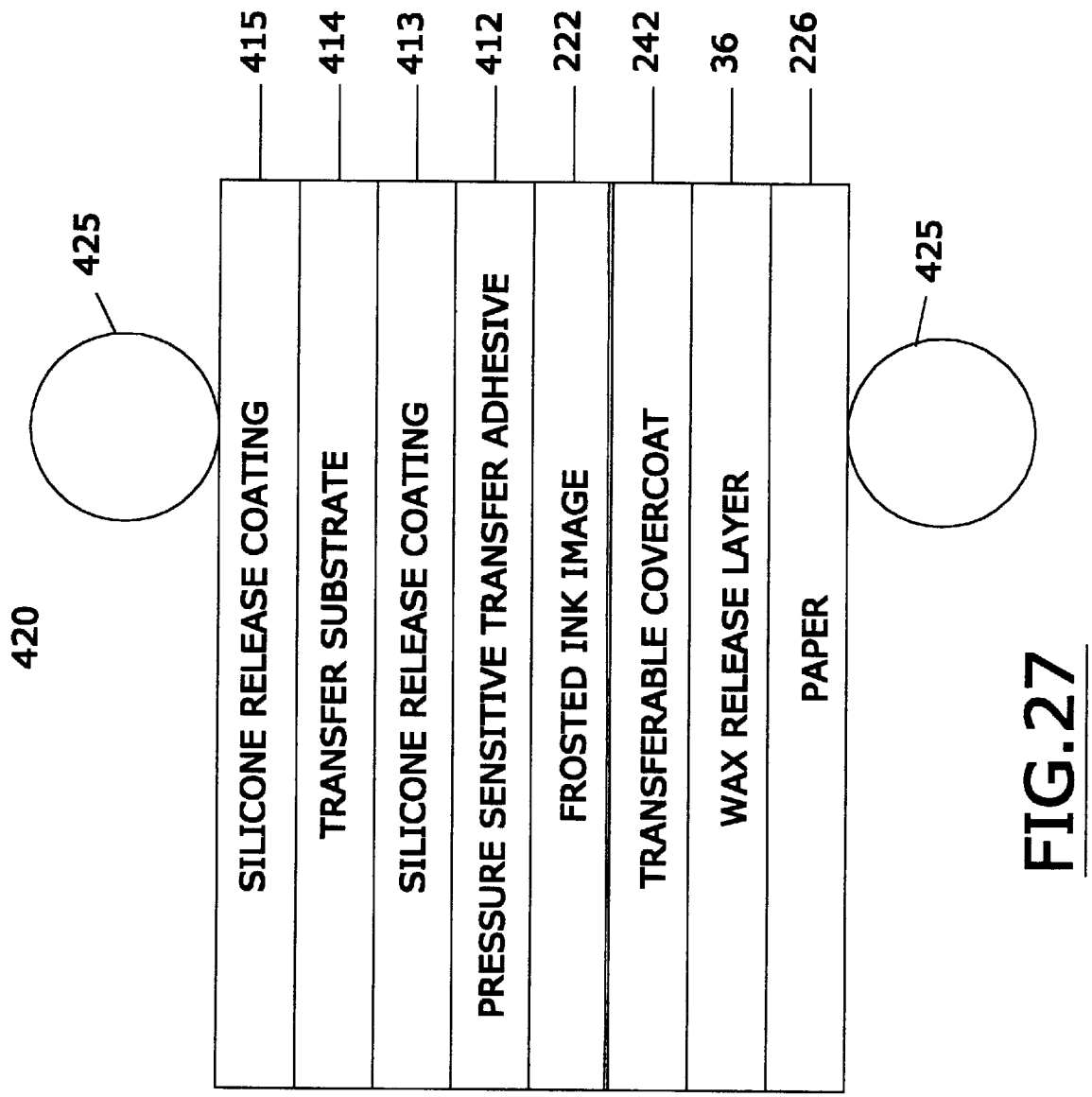
Figure 28:
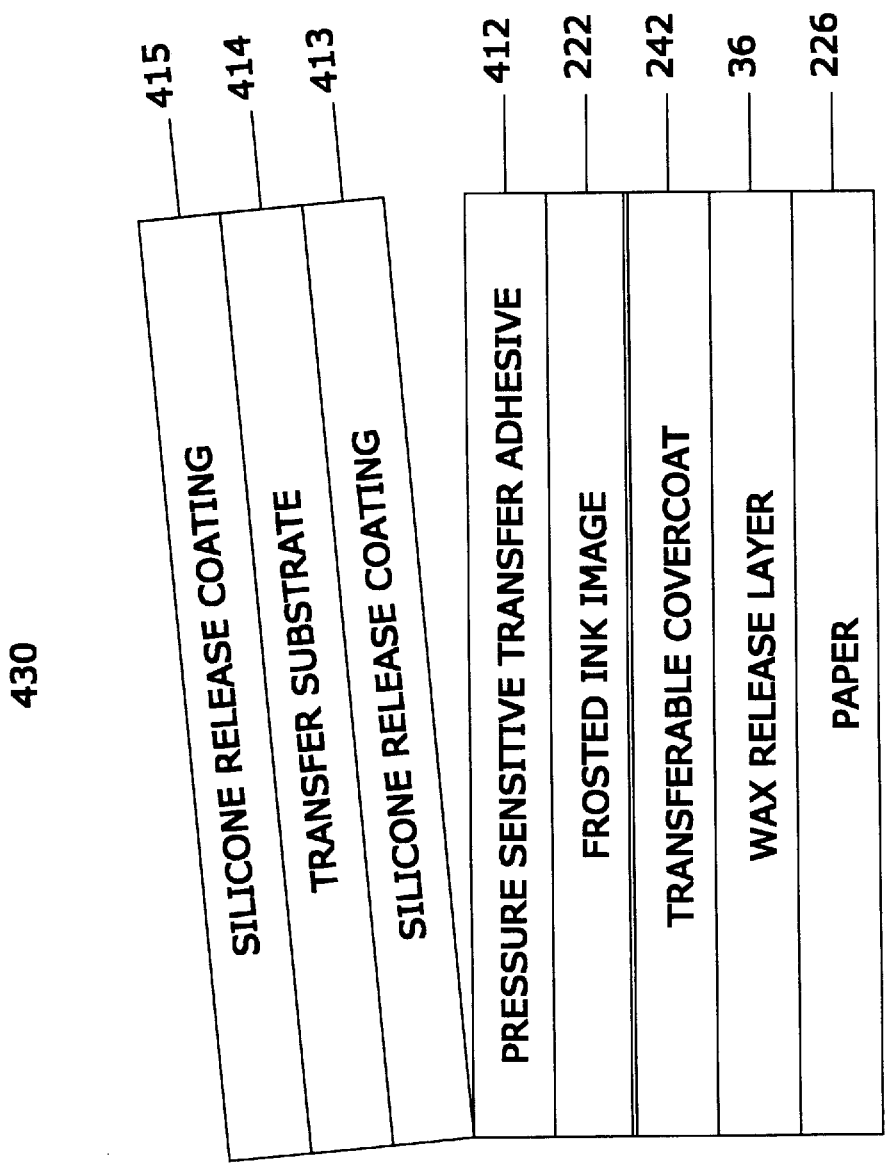
Figure 29:
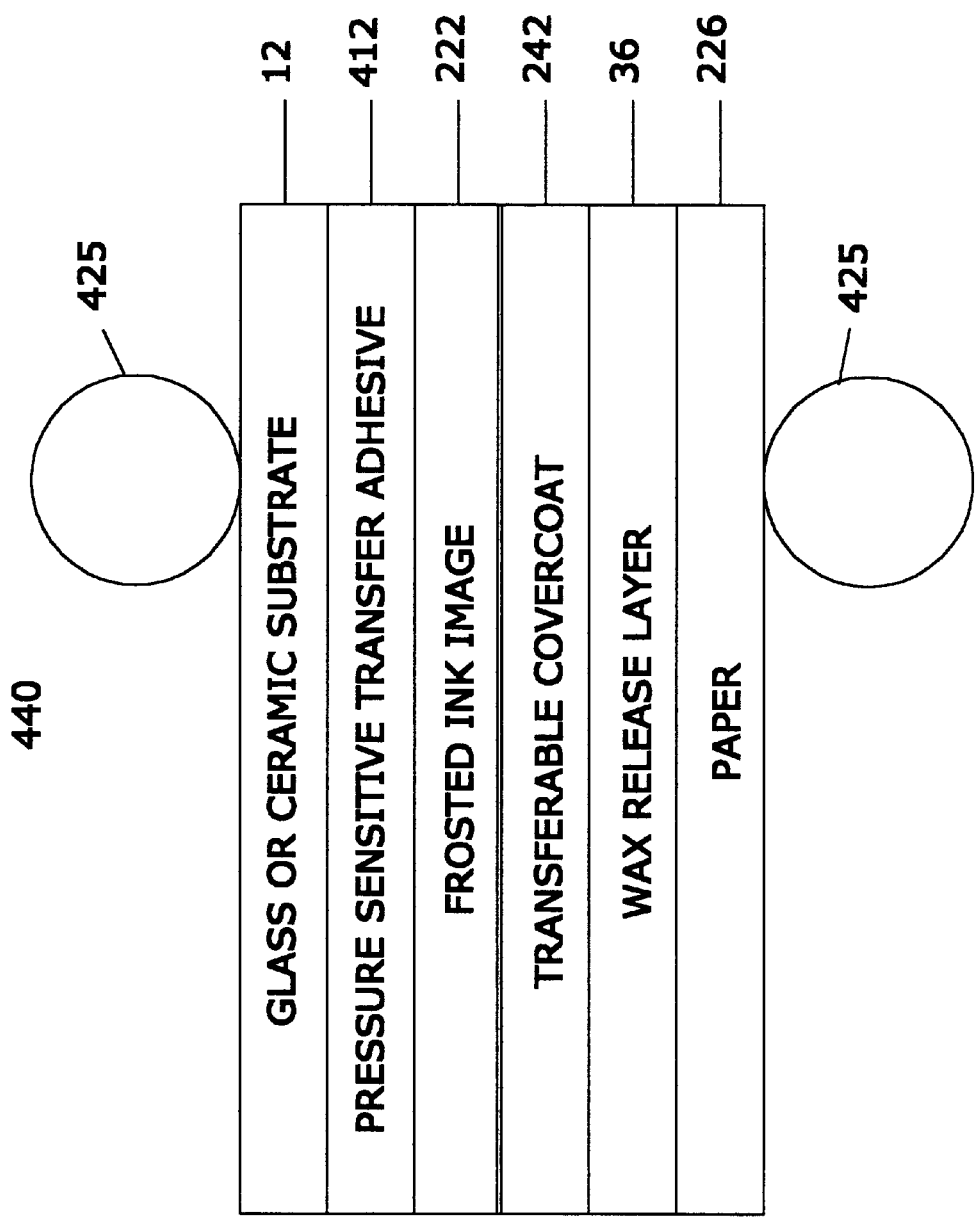
Figure 30:
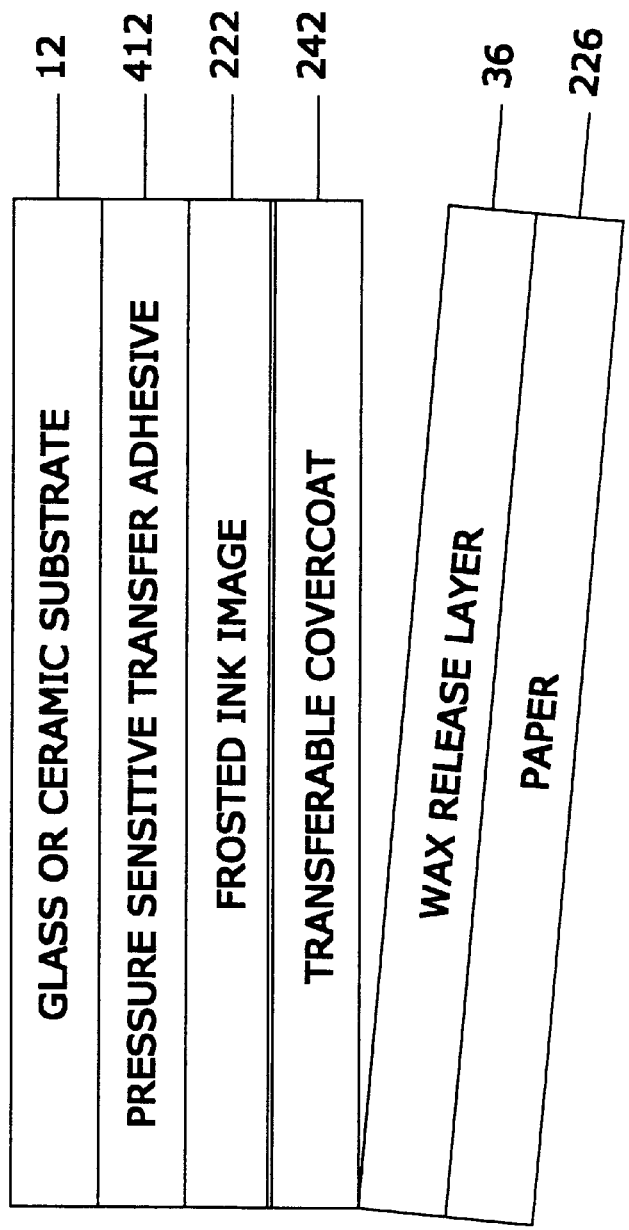
Figure 31:
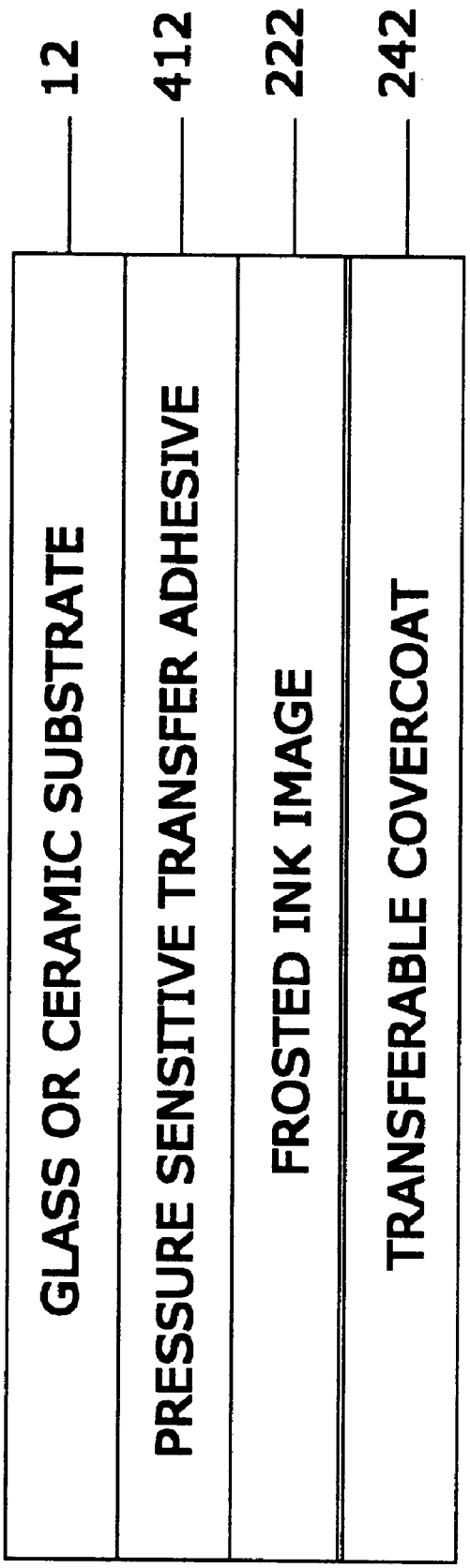
Figure 32:
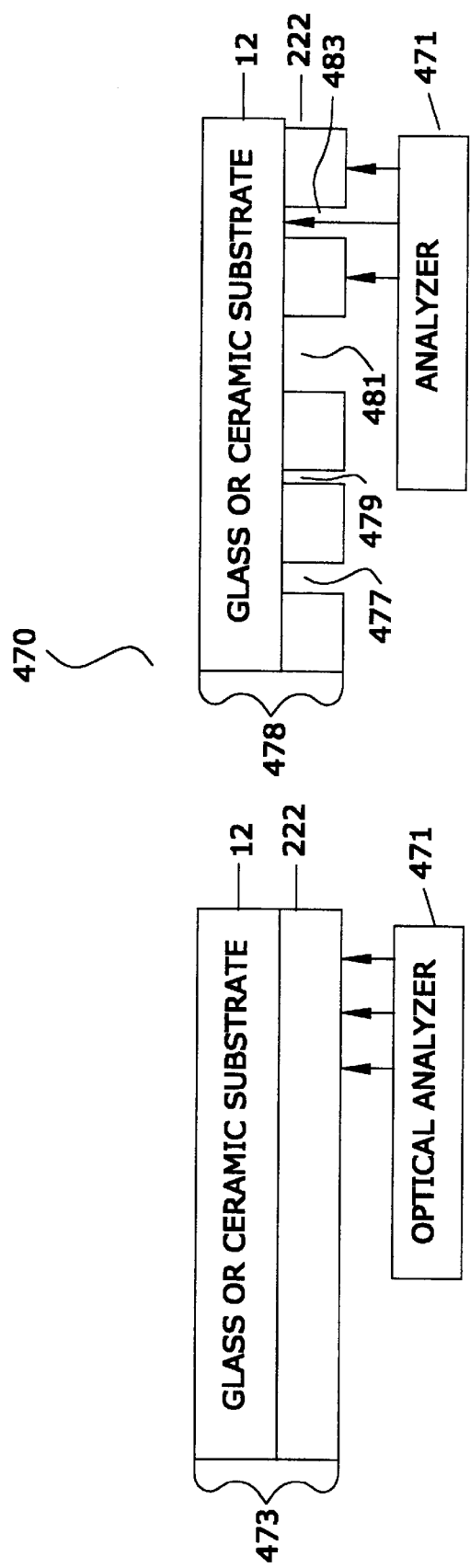

Each of FIGS. 2, 3, 4, 5, and 6 is a schematic of a preferred ribbon which may be used to prepare the ceramic substrate of FIG. 1;

FIG. 6A is a schematic representation of another preferred ribbon which may be used to prepare the ceramic substrate of FIG. 1;

Each of FIGS. 7 and 8 is schematic of a preferred decal which may be used to prepare the ceramic substrate of FIG. 1;

Each of FIGS. 9, 10, 10A, and 11 is a flow diagram illustrating how the ribbon, a first decal, a second decal, and the printed ceramic substrate of the invention, respectively, is made;

FIG. 12 is a schematic representation of a thermal ribbon comprised of a frosting ink layer;

FIGS. 13, 13A, and 13B are schematic representations other thermal ribbons comprised of a frosting ink layer;

FIG. 14 is a schematic representation of a heat transfer paper made with the thermal ribbon of FIG. 12 or FIG. 13;

FIG. 15 is a schematic representation of a Waterslide paper assembly made with the thermal ribbon of FIG. 12 or FIGS. 13, 13A, or 13B;

FIG. 16 is a schematic representation of a transferable covercoat paper assembly;

FIG. 17 is a flow diagram illustrating a process for making a frosting image decal with either the heat transfer paper of FIG. 14, the Waterslide paper assembly of FIG. 15, or the transferable covercoat assembly of FIG. 16;

FIG. 18 is a flow diagram/logic diagram describing how one may transfer the frosting image decal of FIG. 17 to a ceramic substrate;

FIG. 19 is a schematic representation of ceramic or glass substrate on which is disposed a frosting ink image and to covercoat layers;

FIG. 20 is a schematic representation of a flexible substrate on which is disposed a frosting ink image;

FIG. 21 is a schematic representation of a ceramic or glass substrate on which is disposed the flexible substrate of FIG. 20;

FIG. 22 is a schematic representation of a laminated structure in which the flexible substrate assembly of FIG. 20 is disposed between two ceramic or glass layers;

FIG. 23 is a schematic representation of a ceramic or glass substrate beneath which is disposed a frosting ink image;

FIGS. 24 is a flow diagram of one preferred process of the invention;

FIGS. 25A and 25B a schematics of two preferred decals which may be used in the process depicted in FIG. 24;

FIG. 26 is a schematic of a preferred adhesive assembly which may be used in the process depicted in FIG. 24;

FIG. 27 is a schematic of one preferred lamination step of the process depicted in FIG. 24;

FIG. 28 is a schematic of one preferred stripping step of the process depicted in FIG. 24 in which release paper is stripped away from pressure sensitive adhesive;

FIG. 29 is a schematic of one preferred lamination step of the process depicted in FIG. 24 in which the decal is laminated to a glass or ceramic substrate with pressure;

FIG. 30 is a schematic of one preferred stripping step of the process depicted in FIG. 24 in which a paper/wax resin release layer is stripped away to laeave a covercoated image on the glass or ceramic substrate;

FIG. 31 is a schematic of the assembly containing the covercoated image on the glass or ceramic substrate; and FIG. 32 is a schematic of a process of evaluating the optical properties of the glass/ceramic substrate with an image fixed to it.

DESCRIPTION OF THE PREFERRED EMBODIMENTS

In the first part of this specification, a novel thermal transfer system for fired ceramic decals will be discussed. Thereafter, in the second part of the specification, a novel thermal transfer ribbon comprised of a frosting ink will be discussed. In the third part of this specification, a process for preparing a ceramic substrate/adhesive/decal assembly will be described.

FIG. 1 is a schematic representation of a printed ceramic substrate 10 made in accordance with one preferred process of this invention. The Figures of this patent application are not necessarily drawn to scale.

Printed ceramic substrate 10 is comprised of a ceramic substrate 12 onto which the color image(s) is fixed.

The ceramic substrate used in the process of this invention preferentially has a melting temperature of at least 550 degrees Centigrade. As used in this specification, the term melting temperature refers to the temperature or range of temperatures at which heterogeneous mixtures, such as a glass batch, glazes, and porcelain enamels, become molten or softened. See, e.g., page 165 of Loran S. O'Bannon's "Dictionary of Ceramic Science and Engineering" (Plenum Press, New York, 1984). In one embodiment, it is preferred that the substrate have a melting temperature of at least about 580 degrees Centigrade. In another embodiment, such melting temperature is from about 580 to about 1,200 degrees Centigrade.

The ceramic substrate used in the process of this invention preferably is a material which is subjected to a temperature of at least about 540 degrees Celsius during processing and is comprised of one or more metal oxides. Typical of such preferred ceramic substrates are, e.g., glass, ceramic whitewares, enamels, porcelains, etc. Thus, by way of illustration and not limitation, one may use the process of this invention to transfer and fix color images onto ceramic substrates such as dinnerware, outdoor signage, glassware, decorative giftware, architectural tiles, color filter arrays, floor tiles, wall tiles, perfume bottles, wine bottles, beverage containers, and the like.

Referring again to FIG. 1, and in the preferred but optional embodiment depicted therein, it will be seen that a flux underlayer 14 is disposed on top of and bonded to the top surface of the ceramic substrate 12. Flux underlayer 14 is preferably transferred to the ceramic substrate surface at a coating weight (coverage) of at least about 1 gram per square meter. It is preferred to use a coating weight (coverage) for flux layer 14 of at least 7 grams per square meter; and it is more preferred to use a coating weight (coverage) for layer 14 of at least about 14 grams per square meter. As will be apparent to those skilled in the art, the coating weight (coverage) referred to herein (and elsewhere in this specification) is a dry weight, by weight of components which contain less than 1 percent of solvent.

The coating composition used to apply layer 14 onto ceramic substrate 12 must contain frit with a melting temperature of at least about 550 degrees Centigrade. As used in this specification, the term frit refers to a glass which has been melted and quenched in water or air to form small friable particles which then are processed for milling for use as the major constituent of porcelain enamels, fritted glazes, frit chinaware, and the like. See, e.g., page 111 of Loran S. O'Bannon's "Dictionary of Ceramic Science and Engineering," supra.

In one embodiment, the frit used in the process of this invention has a melting temperature of at least about 750 degrees Centigrade. In another embodiment, the frit used in the process of this invention has a melting temperature of at least about 950 degrees Centigrade.

One may use commercially available frits. Thus, by way of illustration and not limitation, one may use a fit sold by the Johnson Matthey Ceramics Inc. (498 Acorn Lane, Downington, Pa. 19335) as product number 94C1001 ("Onglaze Unleaded Flux"), 23901 ("Unleaded Glass Enamel Flux,"), and the like. One may use a flux sold by the Cerdec Corporation of P.O. Box 519, Washington, Pa. 15301 as product number 9630.

Applicants have discovered that, for optimum results, the melting temperature of the frit used should be either substantially the same as or no more than 50 degrees lower than the melting point of the substrate to which the colored image is to be affixed.

The frit used in the coating composition, before it is melted onto the substrate by the heat treatment process described elsewhere in this specification, preferably has a particle size distribution such that substantially all of the particles are smaller than about 10 microns. In one embodiment, at least about 80 weight percent of the particles are smaller than 5.0 microns.

One may use many of the frits known to those skilled in the art such as, e.g., those described in U.S. Pat. Nos. 5,562,748, 5,476,894, 5,132,165, 3,956,558, 3,898,362, and the like. Similarly, one may use some of the frits disclosed on pages 70–79 of Richard R. Eppler et al.'s "Glazes and Glass Coatings" (The American Ceramic Society, Westerville, Ohio, 2000).

Referring again to FIG. 1, the flux underlayer 14 preferably is comprised of at least about 25 weight percent of one or more frits, by total dry weight of all components in layer 14. In one embodiment, from about 35 to about 85 weight percent of frit material is used in flux underlayer 14. In another embodiment, from about 65 to about 75 percent of such frit material is used.

It is preferred that the frit material used in layer 14 comprise at least about 5 weight percent, by dry weight, of silica. As used herein, the term silica is included within the meaning of the term metal oxide; and the preferred frits used in the process of this invention comprise at least about 98 weight percent of one or more metal oxides selected from the group consisting of lithium, sodium, potassium, calcium, magnesium, strontium, barium, zinc, boron, aluminum, silicon, zirconium, lead, cadmium, titanium, and the like.

Referring again to FIG. 1, in addition to the frit, layer 14 also is comprised of one or more thermoplastic binder materials in a concentration of from about 0 to about 75 percent, based upon the dry weight of frit and binder in such layer 14. In one embodiment, the binder is present in a concentration of from about 15 to about 35 percent. In another embodiment, the layer 14 is comprised of from about 15 to about 75 weight percent of binder.

One may use any of the thermal transfer binders known to those skilled in the art. Thus, e.g., one may use one or more of the thermal transfer binders disclosed in U.S. Pat. Nos. 6,127,316, 6,124,239, 6,114,088, 6,113,725, 6,083,610, 6,031,556, 6,031,021, 6,013,409, 6,008,157, 5,985,076, and the like. The entire disclosure of each of these United States patents is hereby incorporated by reference into this specification.

By way of further illustration, one may use a binder which preferably has a softening point from about 45 to about 150 degrees Celsius and a multiplicity of polar moieties such as, e.g., carboxyl groups, hydroxyl groups, chloride groups, carboxylic acid groups, urethane groups, amide groups, amine groups, urea, epoxy resins, and the like. Some suitable binders within this class of binders include polyester resins, bisphenol-A polyesters, polvinyl chloride, copolymers made from terephthalic acid, polymethyl methacrylate, vinylchloride/vinylacetate resins, epoxy resins, nylon resins, urethaneformaldehyde resins, polyurethane, mixtures thereof, and the like.

In one embodiment a mixture of two synthetic resins is used. Thus, e.g., one may use a mixture comprising from about 40 to about 60 weight percent of polymethyl methacrylate and from about 40 to about 60 weight percent of vinylchloride/vinylacetate resin. In this embodiment, these materials collectively comprise the binder.

In one embodiment, the binder is comprised of polybutylmethacrylate and polymethylmethacrylate, comprising from 10 to 30 percent of polybutylmethacrylate and from 50 to 80 percent of the polymethylacrylate. In one embodiment, this binder also is comprised of cellulose acetate propionate, ethylenevinylacetate, vinyl chloride/vinyl acetate, urethanes, etc.

One may obtain these binders from many different commercial sources. Thus, e.g., some of them may be purchased from Dianal America of 9675 Bayport Blvd., Pasadena, Tex. 77507; suitable binders available from this source include "Dianal BR 113" and "Dianal BR 106." Similarly, suitable binders may also be obtained from the Eastman Chemicals Company (Tennessee Eastman Division, Box 511, Kingsport, Tenn.).

Referring again to FIG. 1, in addition to the frit and the binder, the layer 14 may optionally contain from about 0 to about 75 weight of wax and, preferably, 5 to about 20 percent of such wax. In one embodiment, layer 14 is comprised of from about 5 to about 10 weight percent of such wax. Suitable waxes which may be used include camuaba wax, rice wax, beeswax, candelilla wax, montan wax, paraffin wax, microcrystalline waxes, synthetic waxes such as oxidized wax, ester wax, low molecular weight polyethylene wax, Fischer-Tropsch wax, and the like. These and other waxes are well known to those skilled in the art and are described, e.g., in U.S. Pat. No. 5,776,280. One may also use ethoxylated high molecular weight alcohols, long chain high molecular weight linear alcohols, copolymers of alpha olefin and maleic anhydride, polyethylene, polypopylene, These and other suitable waxes are commercially available from, e.g., the Baker-Hughes Baker Petrolite Company of 12645 West Airport Blvd., Sugarland, Tex.

In one preferred embodiment, camuaba wax is used as the wax. As is known to those skilled in the art, carnuaba wax is a hard, high-melting lustrous wax which is composed largely of ceryl palmitate; see, e.g., pages 151–152 of George S. Brady et al.'s "Material's Handbook," Thirteenth Edition (McGraw-Hill Inc., New York, N.Y., 1991). Reference also may be had, e.g., to U.S. Pat. Nos. 6,024,950, 5,891,476, 5,665,462, 5,569,347, 5,536,627, 5,389,129, 4,873,078, 4,536,218, 4,497,851, 4,4610,490, and the like. The entire disclosure of each of these United States patents is hereby incorporated by reference into this specification.

Layer 14 may also be comprised of from about 0 to 16 weight percent of plasticizers adapted to plasticize the resin used. Those skilled in the art are aware of which plasticizers are suitable for softening any particular resin. In one embodiment, there is used from about 1 to about 15 weight percent, by dry weight, of a plasticizing agent. Thus, by way of illustration and not limitation, one may use one or more of the plasticizers disclosed in U.S. Pat. No. 5,776,280 including, e.g., adipic acid esters, phthalic acid esters, chlorinated biphenyls, citrates, epoxides, glycerols, glycol, hydrocarbons, chlorinated hydrocarbons, phosphates, esters of phthalic acid such as, e.g., di-2-ethylhexylphthalate, phthalic acid esters, polyethylene glycols, esters of citric acid, epoxides, adipic acid esters, and the like.

In one embodiment, layer 14 is comprised of from about 6 to about 12 weight percent of the plasticizer which, in one embodiment, is dioctyl phthalate. The use of this plasticizing agent is well known and is described, e.g., in U.S. Pat. Nos. 6,121,356, 6,117,572, 6,086,700, 6,060,214, 6,051,171, 6,051,097, 6,045,646, and the like. The entire disclosure of each of these United States patent applications is hereby incorporated by reference into this specification.

Suitable plasticizers may be obtained from, e.g., the Eastman Chemical Company.

Referring again to FIG. 1, and in the preferred embodiment depicted therein, it will be seen that, disposed over flux layer 14, is opacification layer 16. Opacification layer 16 is optional; but, when it is used, it is preferably used at a coating weight (coverage) of from about 0.5 to about 10 grams per square meter and, more preferably, from about 1 to about 5 grams per square meter.

As is known to those skilled in the art, the opacification layer functions to introduce whiteness or opacity into the substrate by utilizing a substance that disperses in the coating as discrete particles which scatter and reflect some of the incident light. In one embodiment, the opacifying agent is used on a transparent ceramic substrate (such as glass) to improve image contrast properties.

One may use opacifying agents which were known to work with ceramic substrates. Thus, e.g., one may use one or more of the agents disclosed in U.S. Pat. Nos. 6,022,819, 4,977,013 (titanium dioxide), U.S. Pat. No. 4,895,516 (zirconium, tin oxide, and titanium dioxide), U.S. Pat. No. 3,899,346, and the like. The disclosure of each of these United States patents is hereby incorporated by reference into this specification.

One may obtain opacifying agents obtained from, e.g., Johnson Matthey Ceramic Inc., supra, as, e.g., "Superpax Zirconium Opacifier."

The opacification agent used should have a melting temperature at least about 500 degrees Centigrade higher than the melting point of the frit(s) used in layer 14. Generally, the opacification agent(s) have a melting temperature of at least about 1200 degrees Centigrade.

The opacification agent should preferably have a refractive index of greater than 2.0 and, preferably, greater than 2.4.

The opacification agent preferably has a particle size distribution such that substantially all of the particles are smaller than about 10 microns. In one embodiment, at least about 80 weight percent of the particles are smaller than 5.0 microns.

Referring again to FIG. 1, in addition to the opacification agent, opacification layer 16 also is comprised of one or more thermoplastic binder materials in a concentration of from about 0 to about 75 percent, based upon the dry weight of opacification agent and binder in such layer 14. In one embodiment, the binder is present in a concentration of from about 15 to about 35 percent. One may use one or more of the binders described with reference to layer 14. Alternatively, one may use one or more other suitable binders.

In addition to the opacifying agent and the optional binder, one may also utilize the types and amounts of wax that are described with reference to layer 14, and/or different amounts of different waxes. Alternatively, or additionally, one may also use the types and amounts of plasticizer described with reference to layer 14. In general, the only substantive differences between layers 14 and 16 are that the calculations are made with respect to the amount of opacifying agent (in layer 16) and not the amount of frit (as is done in layer 14).

Referring again to FIG. 1, one may optionally use a second flux layer 18 similar in composition and/or concentrations to layer 14. When such a second flux layer is used, it will be disposed over and printed over the opacification layer 16.

Disposed over the flux layer 14 is one or more color images 20. These ceramic colorant image(s) 20 will be disposed over either the ceramic substrate 12 or the flux layer 14, and/or the optional opacification layer 16 when used, and/or the optional second flux layer 18 when used.

It is preferred to apply these color image(s) with a digital thermal transfer printer. Such printers are well known to those skilled in the art and are described in International Publication No. WO 97/00781, published on Jan. 7, 1997, the entire disclosure of which is hereby incorporated by reference into this specification. As is disclosed in this publication, a thermal transfer printer is a machine which creates an image by melting ink from a film ribbon and transferring it at selective locations onto a receiving material. Such a printer normally comprises a print head including a plurality of heating elements which may be arranged in a line. The heating elements can be operated selectively.

Alternatively, one may use one or more of the thermal transfer printers disclosed in U.S. Pat. Nos. 6,124,944, 6,118,467, 6,116,709, 6,103,389, 6,102,534, 6,084,623, 6,083,872, 6,082,912, 6,078,346, and the like. The disclosure of each of these United States patents is hereby incorporated by reference into this specification.

Digital thermal transfer printers are readily commercially available. Thus, e.g., one may use a printer identified as Gerber Scientific's Edge 2 sold by the Gerber Scientific Corporation of Connecticut. With such a printer, the digital color image(s) may be applied by one or more appropriate ribbon(s) in the manner discussed elsewhere in this specification.

Referring again to FIG. 1, the colorant, or colorants which form image 20 are mixed with one or more of the ingredients listed for the opacification layer, with the exception that the colorant(s) is substituted for the opacifying agent(s). Thus, a mixture of the colorant and/or binder and/or wax and/or plasticizer may be used. As will be apparent to those skilled in the art, no glass frit is used in colorant image 20.

It is this element 20 which is selectively applied by the color printer. One such mixture, comprised of one color, may first be digitally printed, optionally followed by one or more differently colored mixtures. The number of colors one wishes to obtain in element 20 will dictate how many different colors are printed.

Although not willing to be bound to any particular theory, applicants believe that the colorant mixtures applied as element 20 tend to admix to some degree.

The amount of colorant used in the composite 11 should not exceed a certain percentage of the total amount of flux used in such composite, generally being 33.33 percent or less. Put another way, the ratio of the total amount of flux in the composite 11 (which includes layers 14, 18, and 24) to the amount of colorant in element 20, in grams/grams, dry weight, should be at least about 2 and, preferably, should be at least about 3. In one embodiment, such ratio is at least 4.0 In another such embodiment, such ratio of flux/colorant is from about 5 to 6. It is noteworthy that, in the process described in U.S. Pat. No. 5,665,472, such ratio was 0.66 (Example 1 at Column 5), or 0.89 (Example 2 at Columns 5–6), or 1.1 (Example 3 at Column 6). At Column 4 of U.S. Pat. No. 5,665,472 (see lines 44 to 49), the patentee teaches that "The proportion of the weight of the bismuth oxide/borosilicate glass frit to the weight of the colorant is preferably 50 to 200% . . . " Thus, substantially more colorant as a function of the flux concentration is used in the process of such patent than is used in applicants' process.

In another embodiment of the invention, the ratio of frit used in the process to colorant used in the process is at least 1.25.

The unexpected results which obtain when the flux/colorant ratios of this invention are substituted for the flux/colorant ratios of the Tanaka patent, and when the flux and colorant layers are separated, are dramatic. A substantially more durable product is produced by the process of the instant invention.

Furthermore, applicants have discovered that, despite the use of substantial amounts of colorant, the process described in U.S. Pat. No. 5,665,472 does not produce transferred images with good color density. Without wishing to be bound to any particular theory, applicants believe that there is a certain optimal amount of encapuslation and immobilization of colorant and/or dissolution of colorant within the flux which is impeded by high concentrations of colorant.

It is disclosed in U.S. Pat. No. 5,665,472 that "The thermal transfer sheet of the present invention can, of course, cope with color treatment," and this statement is technically true. However, such process does not cope very well and must be modified in accordance with applicants' unexpected discoveries to produce a suitable digitally printed backing sheet with adequate durability and color intensity.

The only colorant disclosed in U.S. Pat. No. 5,665,472 is a fired pigment comprised of ferric oxide, cobalt oxide, and chromium trioxide in what appears to be a spinel structure. It is not disclosed where this pigment is obtained from, or what properties it has.

The colorants which work well in applicants' process preferably each contain at least one metal-oxide. Thus, a blue colorant can contain the oxides of a cobalt, chromium, aluminum, copper, manganese, zinc, etc. Thus, e.g., a yellow colorant can contain the oxides of one or more of lead, antimony, zinc, titanium, vanadium, gold, and the like. Thus, e.g., a red colorant can contain the oxides of one or more of chromium, iron (two valence state), zinc, gold, cadmium, selenium, or copper. Thus, e.g., a black colorant can contain the oxides of the metals of copper, chromium, cobalt, iron (plus two valence), nickel, manganese, and the like. Furthermore, in general, one may use colorants comprised of the oxides of calcium, cadmium, zinc, aluminum, silicon, etc.

Suitable colorants are be well known to those skilled in the art. See, e.g., U.S. Pat. Nos. 6,120,637, 6,108,456, 6,106,910, 6,103,389, 6,083,872, 6,077,594, 6,075,927, 6,057,028, 6,040,269, 6,040,267, 6,031,021, 6,004,718, 5,977,263, and the like. The disclosure of each of these United States patents is hereby incorporated by reference into this specification.

By way of further illustration, some of the colorants which can be used in the process of this invention include those described in U.S. Pat. Nos. 6,086,846, 6,077,797 (a mixture of chromium oxide and blue cobalt spinel), U.S. Pat. No. 6,075,223 (oxides of transition elements or compounds of oxides of transition elements), U.S. Pat. No. 6,045,859 (pink coloring element) U.S. Pat. No. 5,988,968 (chromium oxide, ferric oxide), U.S. Pat. No. 5,968,856 (glass coloring oxides such as titania, cesium oxide, ferric oxide, and mixtures thereof), U.S. Pat. No. 5,962,152 (green chromium oxides), U.S. Pat. Nos. 5,912,064, 5,897,885, 5,895,511, 5,820,991 (coloring agents for ceramic paint), U.S. Pat. No. 5,702,520 (a mixture of metal oxides adjusted to achieve a particular color), and the like. The entire disclosure of each of these United States patents is hereby incorporated by reference into this specification.

The ribbons produced by the process of this invention are preferably leach-proof and will not leach toxic metal oxide. This is unlike the prior art ribbons described by Tanaka at Column 1 of U.S. Pat. No. 5,665,472, wherein he states that: "In the case of the thermal transfer sheet containing a glass frit in the binder of the hot-melt ink layer, lead glass has been used as the glass frit, posing a problem that lead becomes a toxic, water-soluble compound." Without wishing to be bound to any particular theory, applicants believe that this undesirable leaching effect occurs because the prior art combined the flux and colorant into a single layer, thereby not leaving enough room in the formulation for sufficient binder to protect the layer from leaching.

The particle size distribution of the colorant used in layer 20 should preferably be within a relatively narrow range. It is preferred that the colorant have a particle size distribution such that at least about 90 weight percent of its particles are within the range of 0.2 to 20 microns.

The colorant used preferably has a refractive index greater than 1.4 and, more preferably, greater than 1.6; and, furthermore, the colorant should not decompose and/or react with the molten flux when subjected to a temperature in range of from about 550 to about 1200 degrees Celsius.

Referring again to FIG. 1, and the preferred embodiment depicted therein, a flux layer 22 optionally may be disposed over the ceramic colorant image element 20. Thus flux layer, when used, will be comparable to the flux layer 18 but need not necessarily utilize the same reagents and/or concentrations and/or coating weight.

Disposed over the colorant image element 20, and coated either onto such element 20 or the optional flux layer 22, is a flux covercoat 24.

Covercoats are described in the patent art. See, e.g., U.S. Pat. Nos. 6,123,794 (covercoat used in decal), U.S. Pat. Nos. 6,110,632, 5,912,064, 5,779,784 (Johnson Matthey OPL 164 covercoat composition), U.S. Pat. Nos. 5,779,784, 5,601, 675 (screen printed organic covercoat), U.S. Pat. No. 5,328, 535 (covercoat for decal), U.S. Pat. No. 5,229,201, and the like. The disclosure of each of these United States patents is hereby incorporated by reference into this specification.

The covercoat 24, in combination with the other flux-containing layers, must provide sufficient flux so that the ratio of flux to colorant is within the specified range. Furthermore, it must apply structural integrity to the ceramic colorant image element 20 so that, as described elsewhere in this specification, when composite 10 is removed from its backing material, it will retain its structural integrity until it is applied to the ceramic substrate.

The covercoat 24 should be substantially water-insoluble so that, after it is contacted with water at 40 degrees Centigrade for 1 minute, less than 0.5 percent will dissolve.

The covercoat 24 should preferably have an elongation before break, as measured by standard A.S.T.M. Test D638-58T, of more than 5 percent.

The covercoat 24 should be applied at a sufficient coating weight to result in a coating weight of at least 2 grams per square meter and, more preferably, at least 5 grams per square meter.

The covercoat 24 preferably is comprised of the aforementioned flux and carbonaceous material(s) which, in one preferred embodiment, when subjected to a temperature of 440 degrees Centigrade for at least 5 minutes, will be substantially completely converted to gaseous material. The aforementioned binders, and/or waxes, and/or plasticizers described, e.g., with relation to layers 14, 16, 18, 20, 22, and 24, are suitable carbonaceous materials, and one or more of them may be used in the proportions described with regard to layer 14 to constitute the covercoat.

One may use a covercoat 24 which is similar in composition and structure to the layer 14. In one embodiment, it is preferred that the covercoat 24 be comprised of a binder selected from the group consisting of polyacrylate binders, polymethacrylate binders, polyacetal binders, mixtures thereof, and the like.

Some suitable polyacrylate binders include polybutylacrylate, polyethyl-co-butylacrylate, poly-2-ethylhexylacrylate, and the like.

Some suitable polymethacrylate binders include, e.g., polymethylmethacrylate, polymethylmethacrylate-co-butylacrylate, polybutylmethacrylate, and the like.

Some suitable polyacetal binders include, e.g., polyvinylacetal, polyvinylbutyral, polyvinylformal, polyvinylacetal-co-butyral, and the like.

Covercoat 24 preferably should have a softening point in the range of from about 50 to about 150 degrees Centigrade.

In one embodiment, covercoat 24 is comprised of from 0 to 75 weight percent of frit and from 25 to about 100 weight percent of a material selected from the group consisting of binder, wax, plasticizer and mixtures thereof.

Figure 2:
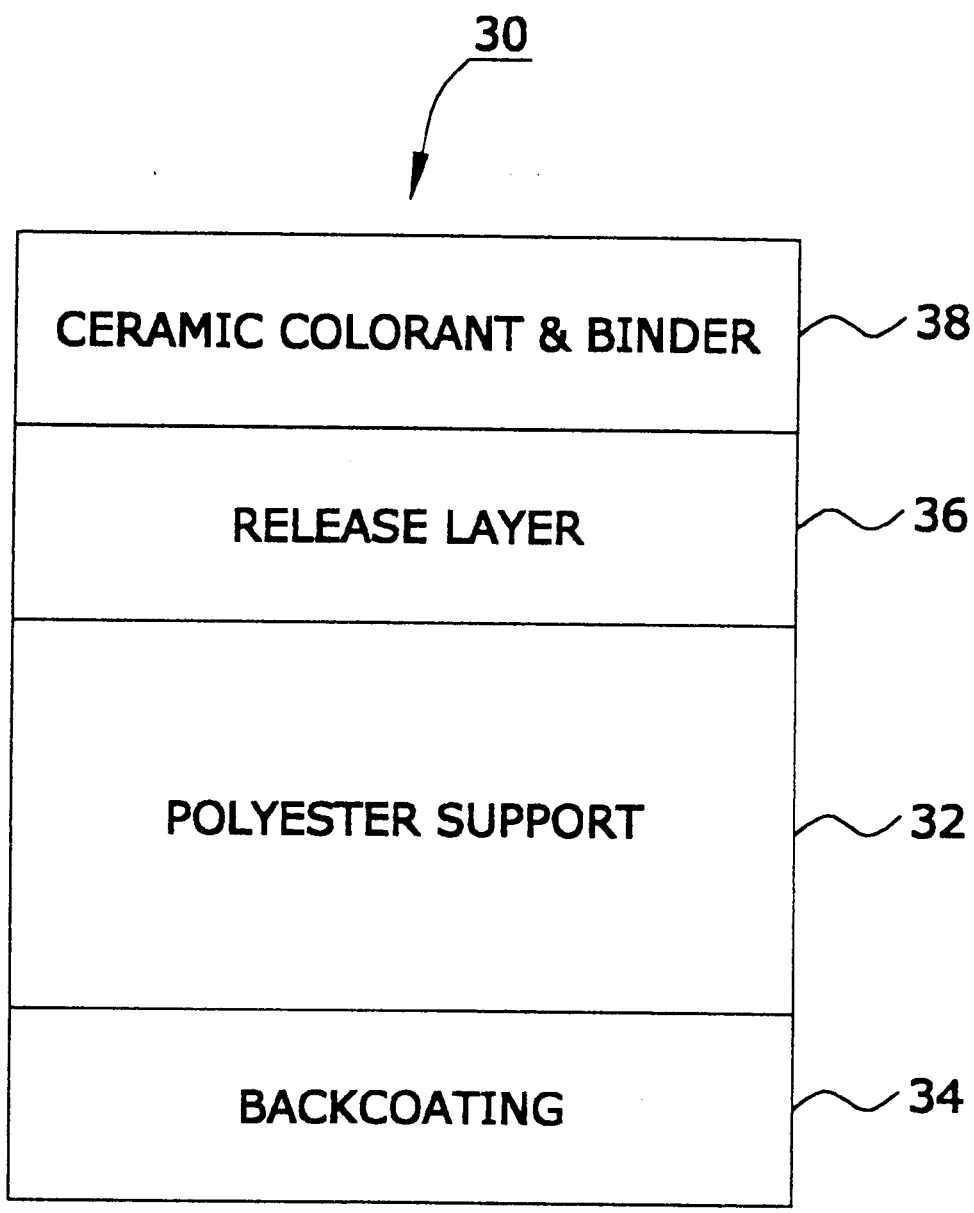

FIG. 2 is a schematic representation of a preferred ribbon which may be used in the process of this invention. Referring to FIG. 2, it will be seen that ribbon 30 is comprised of a flexible substrate 32.

Substrate 32 may be any substrate typically used in thermal transfer ribbons such as, e.g., the substrates described in U.S. Pat. No. 5,776,280; the entire disclosure of this patent is hereby incorporated by reference into this specification.

In one embodiment, substrate 32 is a flexible material which comprises a smooth, tissue-type paper such as, e.g., 30–40 gauge capacitor tissue. In another embodiment, substrate 32 is a flexible material consisting essentially of synthetic polymeric material, such as poly(ethylene terephthalate) polyester with a thickness of from about 1.5 to about 15 microns which, preferably, is biaxially oriented. Thus, by way of illustration and not limitation, one may use polyester film supplied by the Toray Plastics of America (of 50 Belvere Avenue, North Kingstown, R.I.) as catalog number F53.

By way of further illustration, substrate 32 may be any of the substrate films disclosed in U.S. Pat. No. 5,665,472, the entire disclosure of which is hereby incorporated by reference. into this specification. Thus, e.g., one may use films of plastic such as polyester, polypropylene, cellophane, polycarbonate, cellulose acetate, polyethylene, polyvinyl chloride, polystyrene, nylon, polyimide, polyvinylidene chloride, polyvinyl alcohol, fluororesin, chlorinated resin, ionomer, paper such as condenser paper and paraffin paper, nonwoven fabric, and laminates of these materials.

Affixed to the bottom surface of substrate 32 is backcoating layer 34, which is similar in function to the "backside layer" described at columns 2–3 of U.S. Pat. No. 5,665,472. The function of this backcoating layer 34 is to prevent blocking between a thermal backing sheet and a thermal head and, simultaneously, to improve the slip property of the thermal backing sheet.

Backcoating layer 34, and the other layers which form the ribbons of this invention, may be applied by conventional coating means. Thus, by way of illustration and not limitation, one may use one or more of the coating processes described in U.S. Pat. No. 6,071,585 (spray coating, roller coating, gravure, or application with a kiss roll, air knife, or doctor blade, such as a Meyer rod), U.S. Pat. No. 5,981,058 (myer rod coating), U.S. Pat. Nos. 5,997,227, 5,965,244, 5,891,294, 5,716,717, 5,672,428, 5,573,693, 4,304,700, and the like. The entire disclosure of each of these United States patents is hereby incorporated by reference into this specification.

Thus, e.g., backcoating layer 34 may be formed by dissolving or dispersing the above binder resin containing additive (such as a slip agent, surfactant, inorganic particles, organic particles, etc.) in a suitable solvent to prepare a coating liquid. Coating the coating liquid by means of conventional coating devices (such as Gravure coater or a wire bar) may then occur, after which the coating may be dried.

One may form a backcoating layer 34 of a binder resin with additives such as, e.g., a slip agent, a surfactant, inorganic particles, organic particles, etc.

Binder resins usable in the layer 34 include, e.g., cellulosic resins such as ethyl cellulose, hydroxyethylcellulose, hydroxypropylcellulose, methylcellulose, cellulose acetate, cellulose acetate buytryate, and nitrocellulose. Viny resins, such as polyvinylalcohol, polyvinylacetate, polyvinylbutyral, polyvinylacetal, and polyvinylpyrrolidone also may be used. One also may use acrylic resins such as polyacrylamide, polyacrylonitrile-co-styrene, polymethylmethacrylate, and the like. One may also use polyester resins, silicone-modified or fluorine-modified urethane resins, and the like.

In one embodiment, the binder comprises a cross-linked resin. In this case, a resin having several reactive groups, for example, hydroxyl groups, is used in combination with a crosslinking agent, such as a polyisocyanate.

In one embodiment, a backcoating layer 34 is prepared and applied at a coat weight of 0.05 grams per square meter. This backcoating 34 preferably is polydimethylsiloxane-urethane copolymer sold as ASP-2200@ by the Advanced Polymer Company of New Jersey.

One may apply backcoating 34 at a coating weight of from about 0.01 to about 2 grams per square meter, with a range of from about 0.02 to about 0.4 grams/square meter being preferred in one embodiment and a range of from about 0.5 to about 1.5 grams per square meter being preferred in another embodiment.

Referring again to FIG. 2, and in the preferred embodiment depicted therein, it will be seen that substrate 32 contains an optional release layer 36 coated onto its top surface of the substrate. The release layer 36, when used, facilitates the release of the ceramic colorant/binder layer 38 from substrate 32 when a thermal ribbon 30 is used to print at high temperatures.

Release layer 36 preferably has a thickness of from about 0.2 to about 2.0 microns and typically is comprised of at least about 50 weight percent of wax. Suitable waxes which may be used include camuaba wax, rice wax, beeswax, candelilla wax, montan wax, paraffin wax, mirocrystalline waxes, synthetic waxes such as oxidized wax, ester wax, low molecular weight polyethylene wax, Fischer-Tropsch wax, and the like. These and other waxes are well known to those skilled in the art and are described, e.g., in U.S. Pat. No. 5,776,280.

In one embodiment, at least about 75 weight percent of layer 36 is comprised of wax. In this embodiment, the wax used is preferably carnuaba wax.

Minor amounts of other materials may be present in layer 36. Thus, one may include from about 5 to about 20 weight percent of heat-softening resin which softens at a temperature of from about 60 to about 150 degrees Centigrade. Some suitable heatsoftening resins include, e.g., the heat-meltable resins described in columns 2 and of U.S. Pat. No. 5,525,403, the entire disclosure of which is hereby incorporated by reference into this specification. In one embodiment, the heat-meltable resin used is polyethylene-co-vinylacetate with a melt index of from about 40 to about 2500 dg. per minute.

Referring to FIG. 2, and in the preferred embodiment depicted therein, the layer 36 may be omitted and the layer 38 may be directly contiguous with substrate 32.

Ceramic colorant/binder layer 38 is one of the layers used to produce the ceramic colorant image 20. In the process of the invention, a multiplicity of ribbons 30, each one of which preferably contains a ceramic colorant/binder layer 38 with different colorant(s), are digitally printed to produce said ceramic colorant image 20. What these ribbons have in common is that they all contain both binder and colorant material of the general type and in the general ratios described for layer 20. In one preferred embodiment, there is substantially no glass frit in layer 20 (i.e., less than about 5 weight percent). The concentrations of colorant and binder, and the types of colorant and binder, need not be the same for each ribbon. What is the same, however, are the types of components in general and their ratios.

Figure 3:
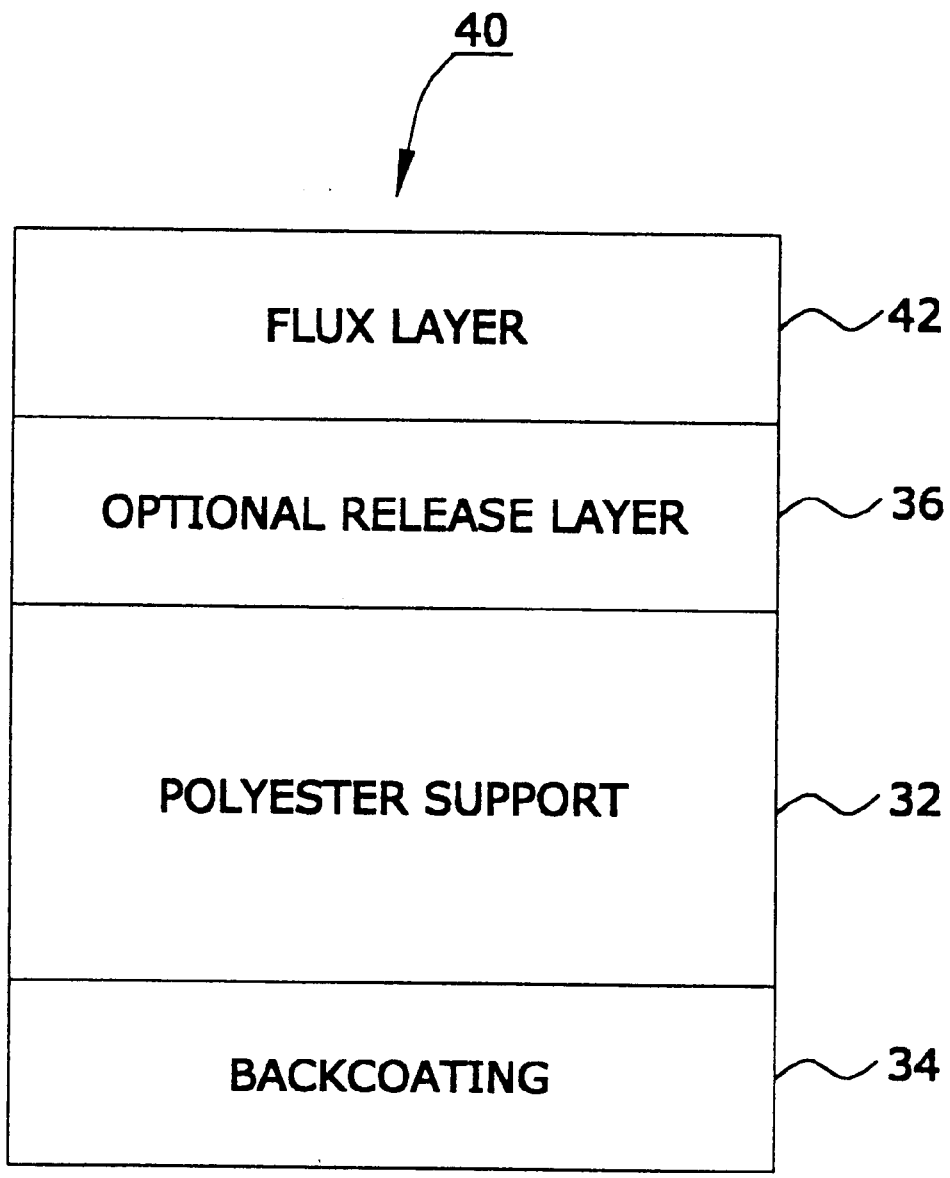

FIG. 3 is a schematic representation of a preferred ribbon 40 which is similar to the ribbon 30 depicted in FIG. 2 but differs therefrom in that it utilizes a flux layer 42 instead of the ceramic colorant and binder element 38. The flux layer 42, in general, has similar components, and ratios, as the composition of flux layer 18 (see FIG. 1) and is used to deposit layer 14 and/or layer 18 and/or layer 22 onto the ceramic substrate 12. As will be apparent to those skilled in the art, the precise composition and coating weight of flux layer 42 will depend upon the precise composition and coating weight of the flux layer 14 and/or flux layer 18 and/or flux layer 22 desired.

In the embodiment depicted in FIG. 1, at least 4 separate flux-containing layers are depicted. In general, it is preferred to utilize at least two such layers. In general, the number of layers of flux required will depend upon how much total flux must be used to keep the total flux/colorant ratio in composite 11 at least 2.0.

It is preferred not to dispose all of the flux required in one layer. Furthermore, it is preferred that at least some of the flux be disposed below the ceramic colorant image, and at least some of the flux be disposed above the ceramic colorant image.

In one embodiment, at least 10 weight percent of the total amount of flux used should be disposed on top of ceramic colorant image 20 in one or more flux layers (such as layers 22 and 24). In this embodiment, at least about 50 percent of the total amount of flux should be disposed below ceramic colorant image 20 in one or more of flux layer 18 and/or flux layer 14.

In another embodiment, from about 30 to about 70 weight percent of the entire amount of frit used in the process of this invention is disposed below the ceramic image 20, and from about 70 to about 30 weight percent of the entire amount of frit used in the process of the invention should be disposed above the ceramic image 20. As will be apparent to those skilled in the art, a layer of material which contains frit need not necessarily be contiguous with the ceramic colorant image 20 to be disposed either below or above it. Thus, by way of illustration and not limitation, and referring to FIG. 1, the flux underlayer 14 is not contiguous with the ceramic colorant image 20 but is still disposed below such image.

In one embodiment, from about 40 to about 60 weight percent of the entire amount of frit used in the process of this invention is disposed below the ceramic image 20, and from about 60 to about 40 weight percent of the entire amount of frit used in the process of the invention should be disposed above the ceramic image 20. In yet another embodiment, from about 75 to about 90 weight percent of the entire amount of frit used in the process of this invention is disposed below the ceramic image 20, and from about 25 to about 10 weight percent of the entire amount of frit used in the process of the invention should be disposed above the ceramic image 20.

If the required amount of flux is not disposed above the ceramic colorant image 20, applicants have discovered that poor color development occurs when cadmium pigments and other pigments are used. Inasmuch as the ceramic substrate 12 (see FIG. 1) is substantially as impervious as a sintered flux layer, applicants do not know precisely why this phenomenon occurs.

For non-cadmium-containing ceramic colorant images, applicants have discovered that acceptable results utilizing a single layer of frit may be obtained so long as the single layer of frit is positioned both above the colorant image 20 and the ceramic substrate 12 and provides a ratio of total frit to ceramic colorant in excess of about 1.25, weight/weight.

Figure 4:
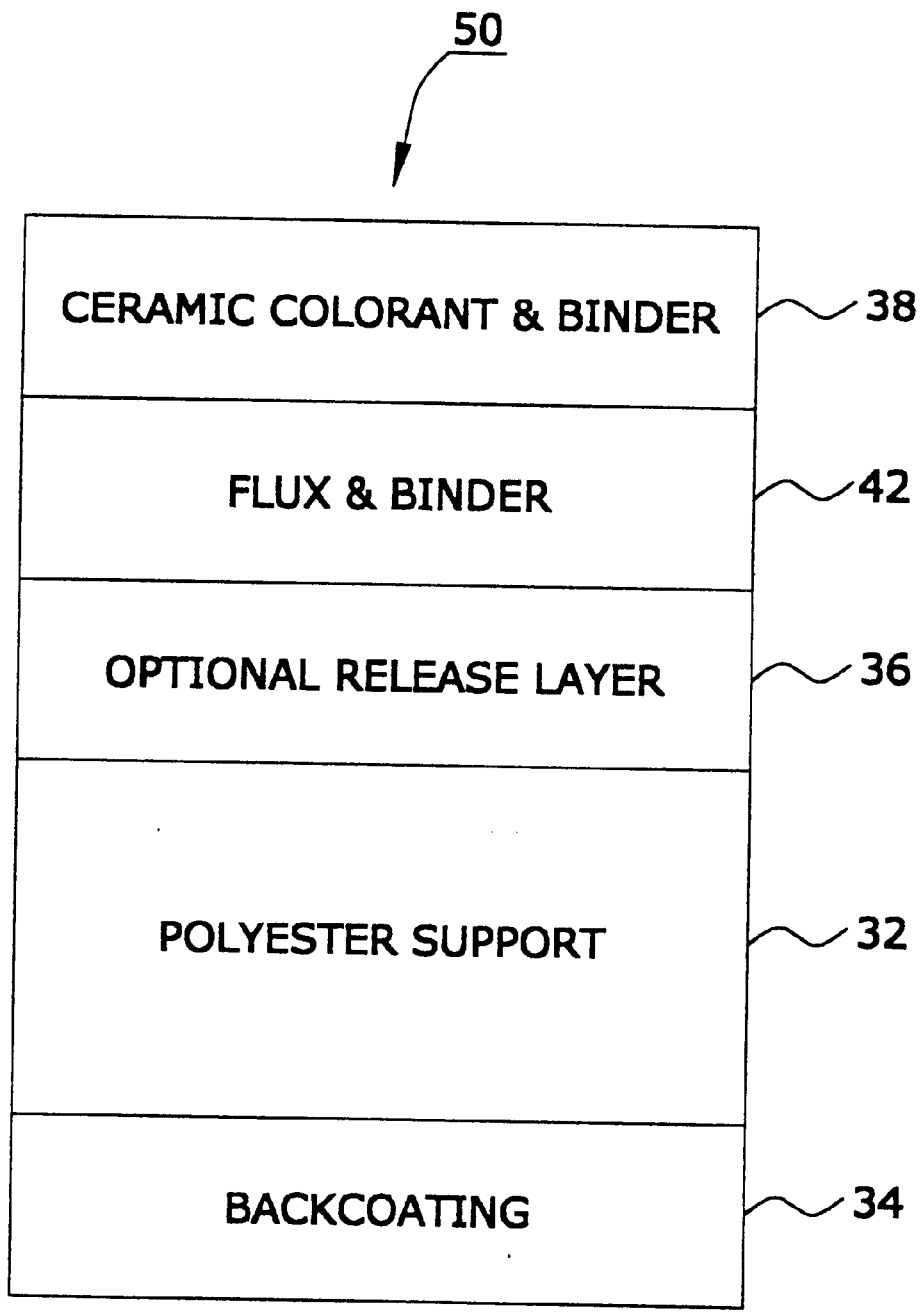

FIGS. 4 is a schematic of yet another preferred ribbon 50 which is similar in construction to the ribbons depicted in FIGS. 2 and 3 but differs therefrom in containing a different arrangement of layers.

Figure 5:
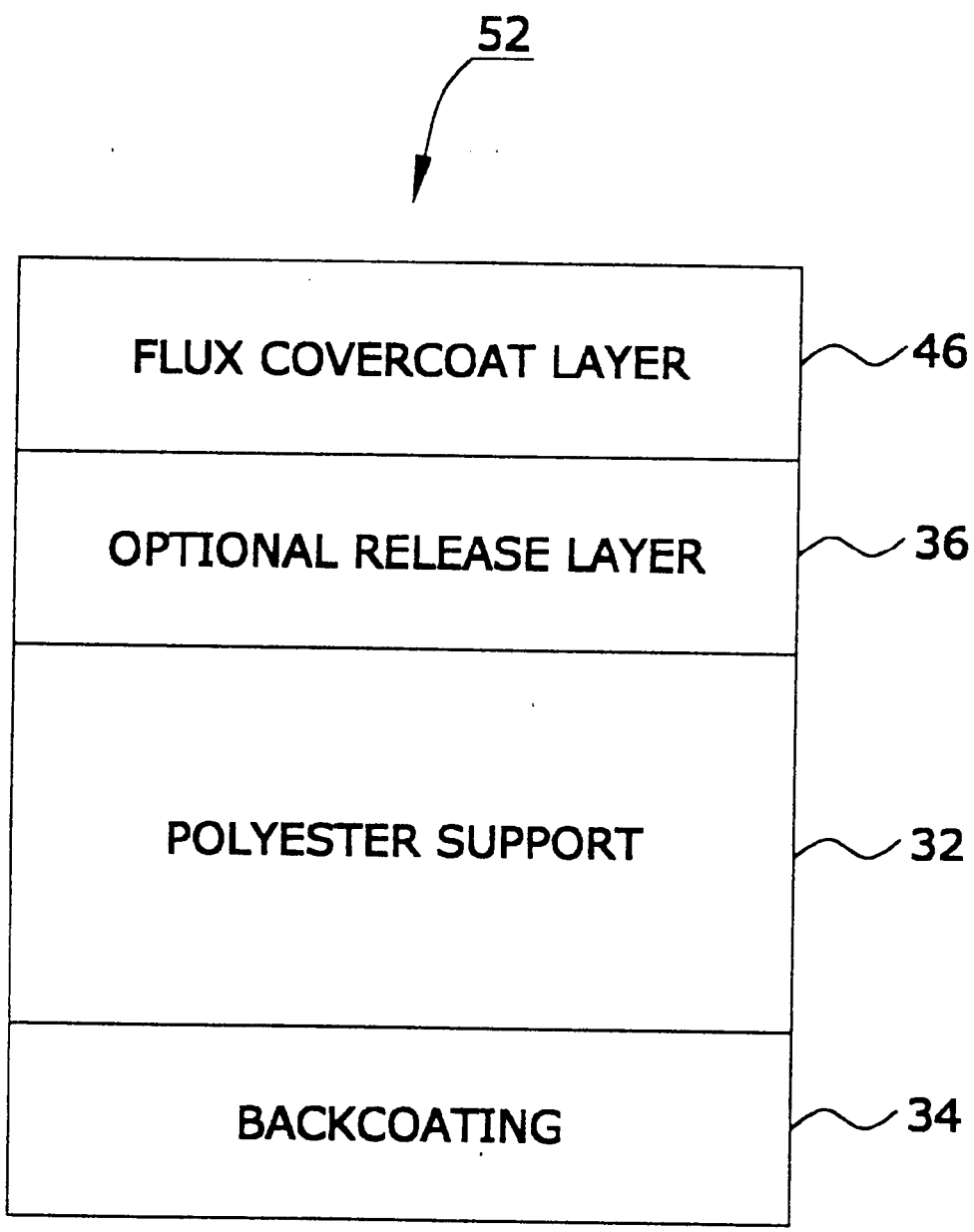

FIG. 5 is a schematic of yet another preferred ribbon 52 which is similar to the ribbons depicted in FIGS. 2, 3, and 4 but differs therefrom in containing a flux covercoat layer 46. As will be apparent to those skilled in the art, the flux covercoat layer 46 may be used to deposit the flux covercoat 24 (see FIG. 1) and, thus, should have a composition similar to the desired covercoat 24.

FIG. 6 is a schematic of yet another preferred ribbon 54 which is similar to the other ribbons depicted but which, additionally, is comprised of opacification layer 48. The opacification layer 48 may be used to print opacification layer 16 (see FIG. 1) and, thus, should contain substantially the same components and ratios as described for layer 16.

FIG. 6 is a schematic representation of a another preferred ribbon 60 of the invention which is comprised of backcoating layer 34, polyester support 32, and release layer 36. Disposed on top of release layer 36 are a multiplicity of panels which are disposed at selected locations on top of release layer 36. Using conventional printing techniques, one of such panels (such as panel 42) is first coated onto release layer 36 at the desired location, followed by selective coating of the second panel 48, the third panel 38 etc. Although the panels 42, 48, 38, and 46 have been shown in a particular configuration in FIG. 6A, it will be apparent that other panels and/or other configurations may be used.

To obtain such selective location(s) of the panels, one may a gravure coating press. What is obtained with this process is a ribbon with repeating sequences of various panels, which thus can be utilized in a single head thermal transfer printer to obtain a print image with multiple colors and or compositions and/or properties.

In this embodiment, it is preferred to use a sequence of 42/48/38/38/38/46 to obtain, with printing operation, and covercoated decal which may be used to produce an image on a ceramic substrate with good print density and good durability.

FIG. 7 is a schematic representation of a ceramic decal 70, which can be produced using one or more of the ribbons depicted in FIGS. 2 through 6A. The various panels 38 shown in FIG. 6A represent one or more ceramic colorant panels used to produce a ceramic colorant image 20.

Referring to FIG. 7, and in the preferred embodiment depicted therein, the ceramic decal 70 is preferably comprised of flexible substrate 72.

Flexible substrate 72 is often referred to as a "backing sheet" in the prior art; see, e.g., U.S. Pat. No. 5,132,165 of Blanco, the entire disclosure of which is hereby incorporated by reference into this specification. Thus, e.g., substrate 72 can include a dry strippable backing or a solvent mount or a water mount slide-off decal. The backing may be of paper or other suitable material such as, e.g., plastic, fabric, and the like. In one embodiment, the backing comprises paper which is coated with a release material, such as dextrine-coated paper. Other possible backing layers include those coated with polyethylene glycol and primary aliphatic oxyethylated alcohols.

By way of further illustration, one may use "Waterslide" paper, which is commercially available paper with a soluble gel coat; such paper may be obtained from Brittians Papers Company of England. This paper is also described in U.S. Pat. Nos. 6,110,632, 5,830,529, 5,779,784, and the like; the entire disclosure of each of these United States patents is hereby incorporated by reference into this specification.

Additionally, one may use heat transfer paper, i.e., commercially available paper with a wax coating possessing a melt point in the range of from about 65 to about 85 degrees Centigrade. Such heat transfer paper is discussed, e.g., in U.S. Pat. Nos. 6,126,669, 6,123,794, 6,025,860, 5,944,931, 5,916,399, 5,824,395, 5,032,449, and the like. The disclosure of each of these United States patents is hereby incorporated by reference into this patent application.

Regardless of what paper is used, it is optionally preferred that a flux layer 74 be either coated to or printed on such paper 72. The thickness of such coating 74 should be at least about 5 microns after such coating has dried, and even more preferably at least about 7 microns. Applicants have discovered that when a coating weight is used which produces a thinner layer 74, poor color development results when cadmium-based ceramic colorants are used. It should be note that, in the process described in U.S. Pat. No. 5,132,165, a thickness of the "prefused glass flux layer" of only from about 3 to about 4 microns is disclosed.

Referring again to FIG. 7, ceramic colorant images 76 (yellow), and/or 78 (magenta) and/or 80 (cyan) and/or 82 (black) may be digitally printed by sequentially using one or more ribbons 30.

Flux layers 42 may optionally be printed by utilizing ribbon 40, which can sequentially print layer 42 in between the various image colors. Alternatively, layer 42 may be printed simultaneously with the image colors by the use of ribbon 50.

The preferred ribbons depicted in FIGS. 2 through 6A afford one a substantial amount of flexibility, when using applicants' process, of preparing decals with many different configurations.

As will be apparent, one or more printers equipped with one or more of such ribbons can be controlled by a computer, which can produce a decal with substantially any desired combination of colors, colored patterns, images, and physical properties.

Referring again to FIG. 7, the flux covercoat 46 may be printed by means, e.g., of ribbon 52.

FIG. 8 is a schematic representation of a decal 80 which is similar in many respects to decal 70 (see FIG. 7) but differs therefrom in containing an opacification layer 48 which is similar in function and composition to the opacification layer 48 depicted for ribbon 54 (see FIG. 6); in another embodiment, not shown, the flux underlayer 14 is omitted. It should be noted that, in image 20, a multiplicity of ceramic images may be digitally printed and superimposed on each other to form such image.

Figure 9:
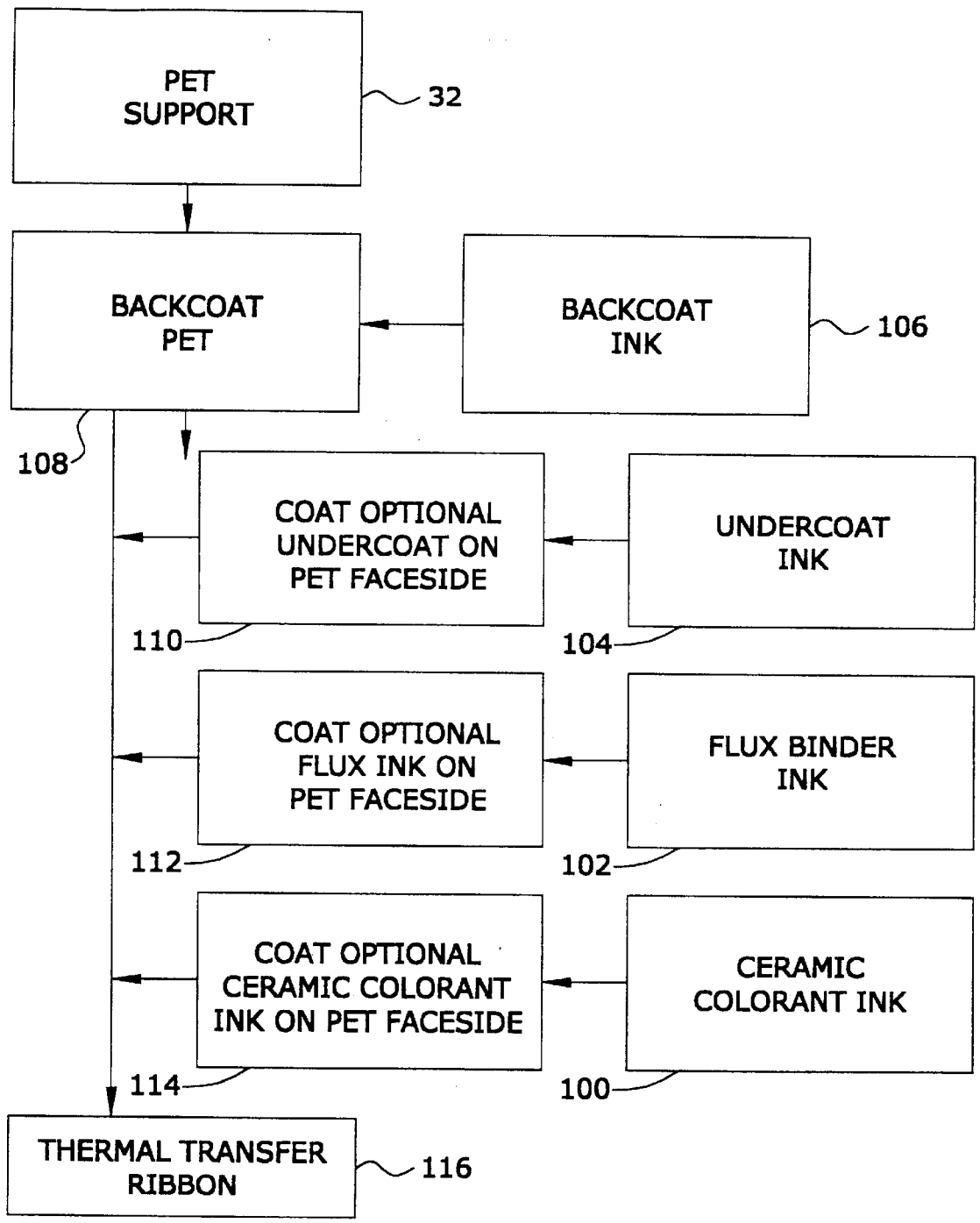

FIG. 9 is a flow diagram of one preferred process for preparing a ribbon of this invention As will be apparent to those skilled in the art, the process illustrated may be used to prepare ribbon 30, and/or ribbon 40, and/or ribbon 50, etc.

In step 100, one may prepare a ceramic colorant ink as described in this specification, in accordance with the description, e.g., of layer 38 of FIG. 2. This ink may be used to coat the faceside of polyester support 32 in step 114 (see FIG. 2).

In step 102, one may prepare a flux binder ink as described in this specification; see, e.g., layer 42 of FIG. 3 and its accompanying description. This flux binder ink may be used to either directly coat the faceside of the polyester support 32 in step 112, and/or coat over an optional release layer 36 in step 110.

In step 104, a release layer is prepared as described in this specification; see, e.g., release layer 36 of FIG. 2 and its accompanying description. This release layer 36 may optionally be used in step 110 to coat the face side of the polyester substrate 32.

In step 106, a backcoat ink may be prepared as described in this specification; see, e.g., backcoating layer 34 of FIG. 2 and its accompanying description. This backcoat layer 34 may be used to coat the backside of the polyester substrate in step 108. In step 114, the faceside of the polyester support 32 may be coated with ceramic colorant ink.

As will be apparent to those skilled in the art, using the combination of steps illustrated in FIG. 9, one may readily prepare one or more of the ribbons illustrated in FIGS. 2 through 5. Furthermore, although not specifically depicted in FIG. 9, one may prepare an opacification layer in accordance with the description of opacification layer 48 (See FIG. 6 and its accompanying description) which may be used to prepare ribbons containing such opacification layer; also see FIG. 6A).

Figure 10:
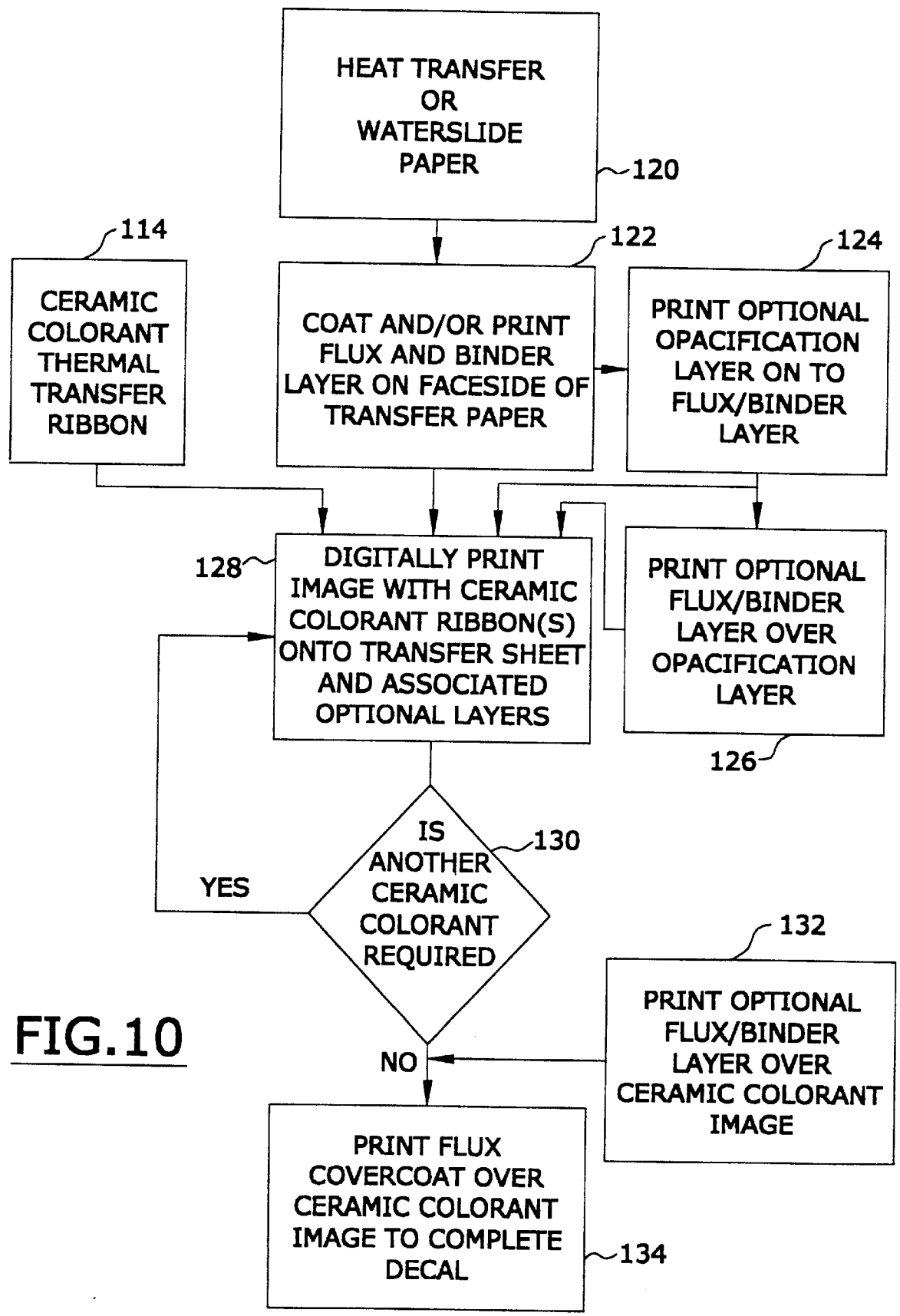

FIG. 10 is a schematic diagram of a preferred process for producing a ceramic decal. In step 120, either heat transfer or Waterslide paper is provided; these papers are described in the specification (see element 72 of FIG. 7 and its accompanying description). A flux and binder layer is either coated or printed on the face of such optional step 122 (see element 74 of FIG. 7 and its accompanying description); and this flux and binder layer, when dried, should be at least about 7 microns thick.

In step 124, one may optionally print an opacification layer onto the flux binder layer described in step 122. This opacification layer corresponds to layer 48 of FIG. 8. It is preferred, when such opacification layer is used in step 122, to print an optional flux/binder layer over the opacification layer in step 126; this optional flux binder layer is described as element 42 of FIG. 8. However, as is illustrated in FIG. 10, the optional flux/binder layer may be omitted, and one may proceed directly from step 124 to step 128. Alternatively, one may omit both the opacification step and the optional flux binder layer step and proceed directly from step 122 to 128.

Whichever pathway one wishes to follow, it is preferred to use a ceramic colorant thermal transfer ribbon 114 in step 128. The preparation of this ribbon was illustrated in FIG. 9.

In step 128, which may optionally be repeated one or more times with different ceramic colorant ribbons 114, an color image is digitally printed using such ribbon 114 and a digital thermal transfer printer. In one embodiment, prints were produced using a Zebra 140XiII thermal transfer printer run at 4 inches per second with energy level settings ranging from 18 to 24.

The digital image to be printed is composed of one or more primary colors, and such image is evaluated to determine how many printings of one or more ceramic colorants are required to produce the desired image. Thus, in decision step 130, if another printing of the same or a different colored image is required, step 128 is repeated. If no such additional printing is required, one may then proceed to step 132 and/or step 134.

In optional step 132, an optional flux binder layer is printed over the ceramic colorant image produced in step(s) 128. This optional flux binder layer corresponds to element 42 of FIG. 8. Thereafter, either one goes from step 132 to 134, or one goes directly from decision step 130 to step 134. In printing step 134, a flux covercoat corresponding to element 24 of FIG. 8 is printed to complete the decal. As will be apparent to those skilled in the art, one may apply the covercoat over the entire decal (which includes both a printed image and unprinted area[s]). Alternatively, one may apply the covercoat over the entire imaged areas.

Figure 11:
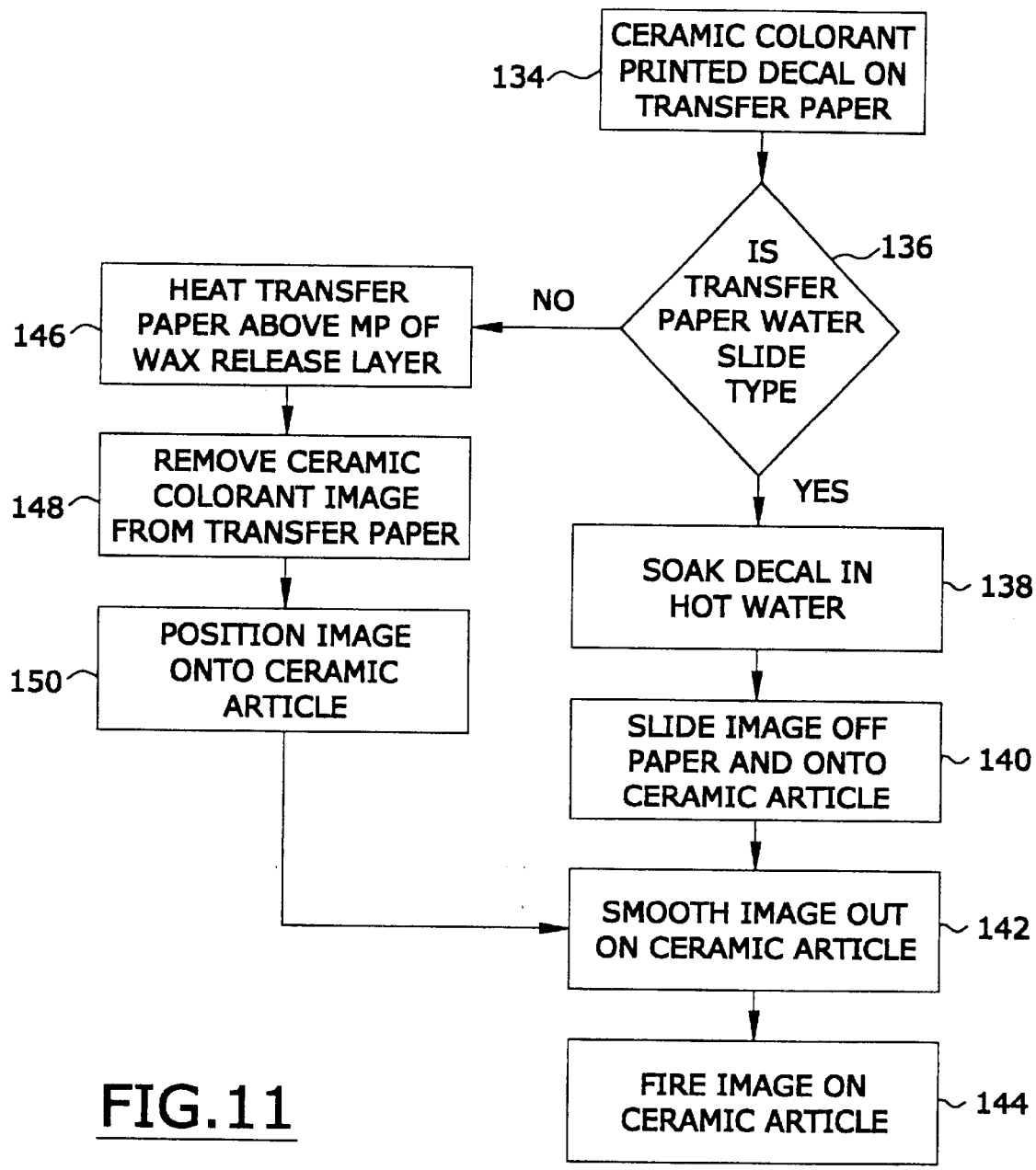

Thus, a complete decal is produced in FIG. 10 and now be may be used in FIG. 11 to produce the imaged ceramic article.

Figure 10A:
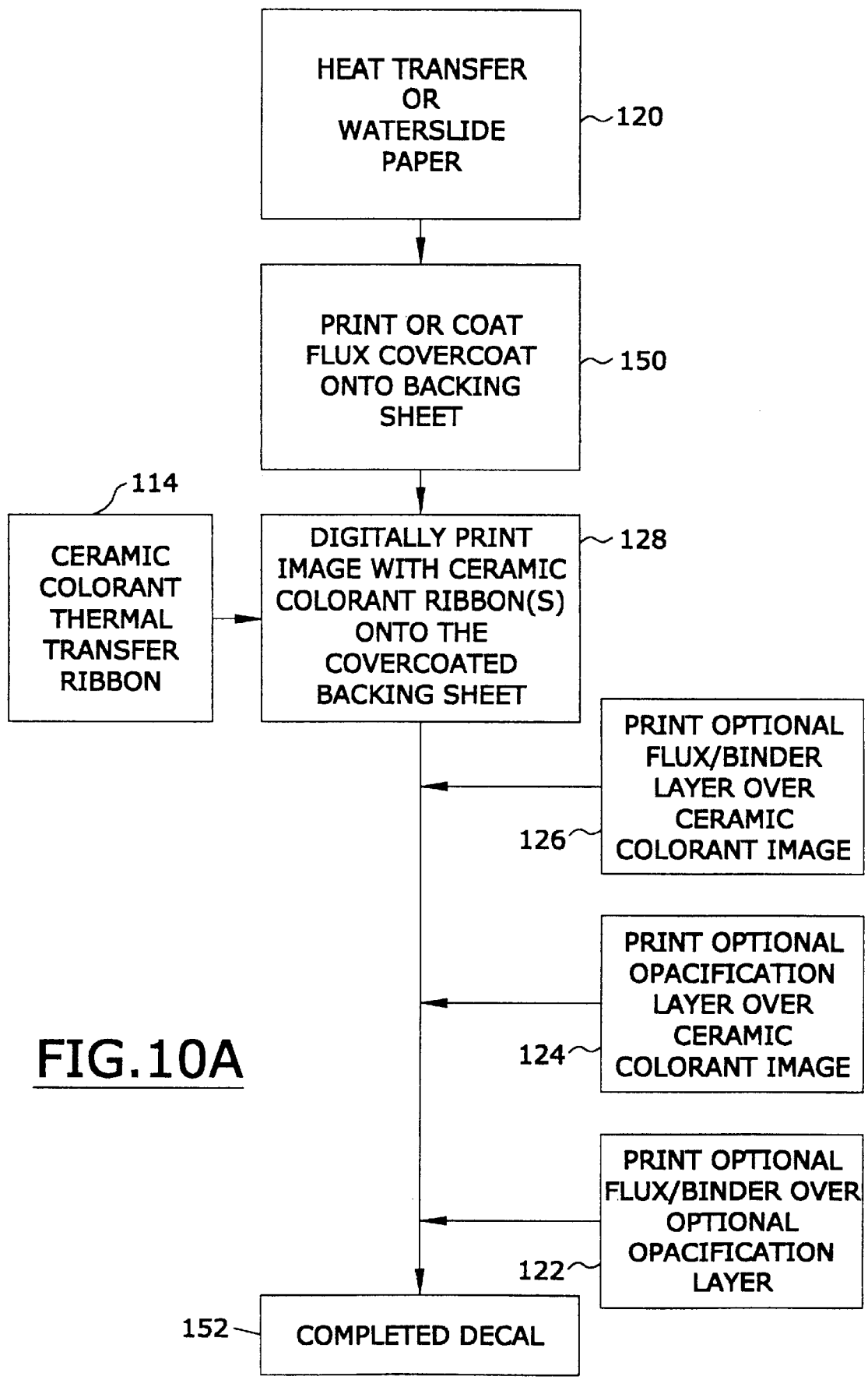

FIG. 10A illustrates an alternative process for preparing a decal according to the invention. As will be apparent to those skilled in the art, the process illustrated in FIG. 10A is very similar to the process illustrated in FIG. 10 with several exceptions. In the first place, in the process of FIG. 10A, in step 150 the covercoat is applied or printed to the assembly prior to the time the ceramic colorant image 128 is applied. Thereafter, following the application of ceramic colorant image 128, optional flux binder (step 126), and/or opacifying agent (step 124), and/or flux/binder (step 122) may be applied to form the decal 152.

The process of FIG. 10A may be used, e.g., to print a decal which thereafter may be applied, e.g., to a wine bottle. Thus, e.g., in such an embodiment, the image is preferably removed from the decal with hot silicone pad or a hot silicone roller. Thereafter, the image is retransferred directly onto the ceramic article (wine bottle) and processed as illustrated in FIG. 11.

In the process depicted in FIG. 11, the decal produced in step 134 of FIG. 10 is treated in one of two ways, depending upon whether the substrate comprising the decal is Waterslide or heat transfer paper.

If the substrate comprising the image is Waterslide paper, then the decal is first soaked in hot water (at a temperature of greater than 40 degrees Centigrade. for preferably at least about 30 seconds). In step 138, the image on the Waterslide paper is then separated from the paper in step 140, this image is then placed onto a ceramic substrate and smoothed to remove wrinkles or air bubbles in step 142 and dried; and the image is then "fired." The imaged ceramic substrate is subjected to a temperature of from about 550 to about 1200 degrees Centigrade in step 144.

If, alternatively, the substrate is heat transfer paper, then the decal is heated above the melting point of the wax release layer on the paper in step 146; such temperature is generally from about 50 to about 150 degrees Centigrade. Thereafter, while said wax release layer is still in its molten state, one may remove the ceramic colorant image from the paper in step 148, position the image onto the ceramic article in step 150, and then follow steps 142 and 144 as described hereinabove.

When one wishes to make the ornamental wine bottle referred to hereinabove, the step 148 may be accompanied with the use of the hot silicone pad and/or the hot silicone roller described hereinabove.

A thermal Transfer Ribbon Comprised of Frosting Ink

In one preferred embodiment, the thermal transfer ribbon of this invention is used to directly or indirectly prepare a digitally printed "frost" or "frosting" on a ceramic or glass substrate. As is known to those skilled in the art, frosting is a process in which a roughened or speckled appearance is applied to metal or glass. Reference may be had, e.g., to U.S. Pat. Nos. 6,092,942, 5,844,682, 5,585,555, 5,536,595, 5,270,012, 5,209,903, 5,076,990, 4,402,704, 4,396,393, and the like. The entire disclosure of each of these United States patents is hereby incorporated by reference into this specification.

FIG. 12 is a schematic representation of one preferred thermal ribbon 200 comprised of a frosting ink layer 202. The ribbon depicted in this Figure is prepared in substantial accordance with the procedure described elsewhere in this specification.

The frosting ink layer 202 is preferably comprised of from about 15 to about 94.5 weight percent of a solid, volatilizable carbonaceous binder; in one preferred embodiment, the frosting ink layer is comprised of from about 20 to about 40 weight percent of such solid, volatilizable carbonaceous binder.

As used herein, the term carbonaceous refers to a material which is composed of carbon. The term volatilizable, as used in this specification, refers to a material which, after having been heated to a temperature of greater than 350 degrees Centigrade for at least 5 minutes in an atmosphere containing at least about 15 volume percent of oxygen, will be transformed into gas and will leave less than about 5 weight percent (by weight of the original material) of a residue comprised of carbonaceous material.

The solid, volatilizable carbonaceous binder may be one or more of the resins, and/or waxes, and/or plasticizers described elsewhere in this specification Reference may be had, for example, to the thermoplastic binders described elsewhere in this specification.

Referring again to FIG. 12, the frosting ink layer is preferably comprised of from about 5 to about 75 weight percent of a film forming glass flux which melts at a temperature of greater than about 550 degrees Centigrade. As is known to those skilled in the art, such a film forming material is able to form a continuous film when fired at a temperature of above 550 degrees Centigrade. Reference may be had, e.g., to the frits used to form underlayer 14 (see FIG. 1) and or flux layer 18 (see FIG. 1) and/or flux layer 22 (see FIG. 1).

In one preferred embodiment, the frosting ink layer is comprised of from about 35 to about 75 weight percent of the film forming glass flux. In another embodiment, the frosting ink layer is comprised of from about 40 to about 75 weight percent of the film forming glass flux.

The film forming glass flux used in frosting ink layer 202 preferably has a refractive index less than about 1.4.

By way of illustration and not limitation, and in one preferred embodiment, the film forming glass flux used in frosting ink layer 202 is comprised of 48.8 weight percent of unleaded glass flux 23901 and 9.04 weight percent of OnGlaze Unleaded Flux 94C1001, each of which is described elsewhere in this specification.

Referring again to FIG. 12, the frosting ink layer 12 is preferably comprised of at least about 0.5 weight percent of opacifying agent with a melting temperature of at least 50 degrees Centigrade above the melting temperature of the film forming glass, a refractive index of greater than about 1.4, and a particle size distribution such that substantially all of its particles are smaller than about 20 microns. One may use one or more of the opacifying agents described elsewhere in this specification by reference to opacification layer 16 (see FIG. 1). One may use other opacifying agents such as, e.g., Superpax Zircon Opacifier. This and other suitable opacifying agents are described elsewhere in this specification.

In one embodiment, from about 2 to about 25 weight percent of the opacifying agent is used. In another embodiment, from about 5 to about 20 weight percent of the opacifying agent is used. Thus, e.g., one may 8.17 weight percent of such Superpax Zircon Opacifier opacifying agent.

In one preferred embodiment, it is preferred that the refractive index of the opacifying agent(s) used in the frosting ink layer 202 be greater than about 1.4 and, preferably, be greater than about 1.7.

The film forming glass flux(es) and the opacifying agent (s) used in the frosting ink layer 202 should be chosen so that the refractive index of the film forming glass flux material(s) and the refractive index of the opacifying agent material(s) differ from each other by at least about 0.1 and, more preferably, by at least about 0.2. In another preferred embodiment, the difference in such refractive indices is at least 0.3, with the opacifying agent having the higher refractive index.

The film forming glass flux(es) and the opacifying agent (s) used in the frosting ink layer 202 should be chosen such that melting point of the opacifying agent(s) is at least about 50 degrees Centigrade higher than the melting point of the film forming glass flux(es) and, more preferably, at least about 100 degrees higher than the melting point of the film forming glass fluxes. In one embodiment, the melting point of the opacifying agent(s) is at least about 500 degrees Centigrade greater than the melting point of the film forming glass flux(es). Thus, it is generally preferred that the opacifying agent(s) have a melting temperature of at least about 1,200 degrees Centigrade.

It is preferred that the weight/weight ratio of opacifying agent/film forming glass flux used in the frosting ink layer 202 be no greater than about 1.25

Referring again to FIG. 12, and in one embodiment, thereof, the frosting ink layer 202 is optionally comprised of from about 1 to about 25 weight percent of platy particles; in an even more preferred aspect of this embodiment, the concentration of the platy particles is from about 5 to about 15 weight percent. As is known to those skilled in the art, a platy particle is one whose length is more than three times its thickness. Reference may be had, e.g., to U.S. Pat. Nos. 6,277,903, 6,267,810, 6,153,709, 6,139,615, 6,124,031, 6,004,467, 5,830,364, 5,795,501, 5,780,154, 5,728,442, 5,693,397, 5,645,635, 5,601,916, 5,597,638, 5,560,983, 5,460,935, 5,457,628, 5,447,782, 5,437,720, 5,443,989, 5,364,828, 5,242,614, 5,231,127, 5,227,283, 5,196,131, 5,194,124, 5,153,250, 5,132,104, 4,548,801, 4,544,761, 4,465,797, 4,405,727, 4,154,899, 4,131,591, 4,125,411, 4,087,343, and the like. The entire disclosure of each of these United States patents is hereby incorporated by reference into this specification.

The platy particles are preferably platy inorganic particles such as, e.g., platy talc. Thus, by way of illustration and not limitation, one may use "Cantal 290" micronized platy talc sold by the Canada Talc company of Marmora Mine Road, Marmora, Ontario, Canada. This platy talc has a particle size distribution such that substantially all of its particles are smaller than about 20 microns. Alternatively, or additionally, one may use, e.g., Cantal 45–85 platy particles, and/or Sierralite 603 platy particles; Sierralite 603 particles are sold by Luzenac America, Inc. of 9000 East Nicols Avenue, Englewood, Colo.

In one preferred embodiment, the frosting ink layer 202 optionally contains from 0.5 to about 25 weight percent of a colorant such as, e.g., the metal-oxide colorants referred to in reference to ceramic colorant layer 38 (see FIG. 2). It is preferred that such optional metal oxide pigment, when used in ink layer 202, have a have a refractive index of greater than 1.4.

The thermal ribbon 202 depicted in FIG. 12 may be prepared by the means described elsewhere in this specification (see, e.g., the examples). In particular, The frosting ink layer 202 is preferably prepared by coating a frosting ink at a coating weight of from about 2.0 to about 15 grams per square meter onto the polyester substrate. In one embodiment, the coating weight of the frosting ink layer 202 is from about 4 to about 10 grams per square meter.

In the embodiment depicted in FIG. 12, the polyester support 32 preferably has a thickness of from about 2.5 to about 15 microns, and the backcoat 34 preferably has a coating weight of from about 0.02 to about 1.0 grams per square meter. A similar ribbon 210 is depicted in FIG. 13.

The ribbon 210 is substantially identical to the ribbon 200 with the exception that it contains an undercoating layer 212. This undercoat layer 212 is preferably comprised of at least about 75 weight percent of one or more of the waxes and thermo plastic binders described elsewhere in this specification, and it preferably has a coating weight of from about 0.1 to about 2.0 grams per square meter.

The ribbon 210 (see FIG. 13) may be prepared by means described elsewhere in this specification. Reference may be had, e.g., to the Examples of this case.

In FIG. 13A, a ribbon 211 is illustrated which may be constructed in a manner similar to that used for ribbons 200 and 210. The ribbon 211 additionally comprises one or more covercoats 213 which are substantially free of glass frit (containing less than about 5 weight percent of glass) and which preferably each have a coating weight of from about 1 to about 10 grams per square meter. These covercoats 213 preferably are comprised of at least 80 weight percent of one or more of the thermoplastic binders described elsewhere in this specification. The thermoplastic binder material(s) used in the covercoat(s) preferably have an elongation to break of more than about 2 percent, as determined by the standard A.S.T.M. test.

In the embodiment depicted in FIG. 13A, the frosting ink layer preferably has a coat weight of from about 2 to about 15 grams per square meter, the undercoat 212 preferably has a coat weight of from about 0.2 to about 1 grams per square meter, and the polyester substrate 32 preferably has a thickness of from about 3 to about 10 microns.

A similar ribbon 215 is depicted in FIG. 13B. This ribbon is substantially identical to the ribbon depicted in FIG. 13A with the exception that it omits a covercoat 213 disposed on top of the frosting ink layer 202.

The ribbons 200 and/or 210 and/or 211 and/or 215 may be used to prepare a frosting decal. Thus, e.g., one such process comprises the steps of applying to a backing sheet a covercoat comprised of a thermoplastic material with an elongation to break greater than 2 percent and a digitally printed frosting image. The digitally printed frosting image is comprised of a solid carbonaceous binder (described elsewhere in this specification), and a mixture of a film forming glass flux and one or more opacity modifying particles, wherein the difference in the refractive index between the particles and the glass frit is at least 0.1 and the melting point of the particles is at least 50 degrees Centigrade greater than that of the film forming glass flux.

The backing sheet used in this process may be typically polyester or paper. Alternatively, or additionally, the backing sheet may comprise or consist of cloth, flexible plastic substrates, and other substrates such as, e.g., substantially flat materials. When paper is used in this embodiment, it is preferred that similar in composition to the papers described elsewhere in this specification.

FIG. 14 is a schematic representation of one preferred heat transfer paper 220 made with the thermal ribbon of FIG. 12 or FIG. 13. Referring to FIG. 14, it will be seen that, in the preferred embodiment depicted, a wax release layer 36 (see FIG. 2) may be coated onto paper 226 by means described elsewhere in this specification. This wax release layer 36 preferably has a thickness of from about 0.2 to about 2.0 microns and typically is comprised of at least about 50 weight percent of wax.

Referring again to FIG. 14, a covercoat layer 224 is disposed above a paper substrate 226. The covercoat layer 224 preferably is comprised of at least 25 weight percent of one or more of the aforementioned thermoplastic materials with an elongation to break greater than about 2 percent. In one embodiment, the covercoat layer 224 is comprised of at least about 50 weight percent of such thermoplastic material.

In the preferred embodiments depicted in FIGS. 13, 13A, 13B, 14, 15, and 16, the covercoat layers 213 and/or 224 contain less than about 5 weight percent of glass frit. In another embodiment, such covercoat layers contain less than about 1 weight percent of glass frit.

In one preferred embodiment, the covercoat layer 224 is comprised of a thermoplastic material with an elongation to break of at least about 5 percent.

By way of illustration and not limitation, suitable thermoplastic materials which may be used in covercoat layer 224 include, e.g., polyvinylbutyral, ethyl cellulose, cellulose acetate propionate, polyvinylacetal, polymethylmethacrylate, polybutylmethacrylate, and mixtures thereof.

Referring again to FIG. 14, after the covercoat layer 224 has been applied, the frosting ink image 222 may be digitally applied with the use of either the ribbon 200 and/or the ribbon 210 and/or the ribbon 211 and/or the ribbon 215 by means of the printing process described elsewhere in this specification.

FIG. 15 is a schematic representation of a Waterslide assembly 230 which is similar to the heat transfer paper 220 but differs therefrom in several respects. In the first place, the wax release layer 36 is replaced by the water soluble gel layer 228; in the second place, the paper 226 is replaced by the Waterslide paper substrate 229. As is known to those skilled in the art, and as is taught elsewhere in this specification, Waterslide paper is commercially available with soluble gel coating 228.

The Waterslide paper assembly (elements 229 and 228), in the embodiment depicted in FIG. 15, is first coated with covercoat layer 224 at a coat weight of from about 2 to about 20 grams per square meter and then digitally printed with frosting ink image 222 by the means described elsewhere in this specification.

FIG. 16 is a schematic representation of a transferable covercoat assembly 240, which is comprised of paper substrate 226, transferable covercoat paper 242, and frosting ink image 222.

The aforementioned description is illustrative only and that changes can be made in the ingredients and their proportions, and in the sequence of combinations and processes steps, as well as in other aspects of the invention discussed herein.

Thus, for example, in one embodiment the decorated ceramic article 10 depicted in FIG. 1 comprises a ceramic or glass substrate 12 on which a ceramic colorant image 20 is disposed. A similar ceramic glass substrate 300 is depicted in FIG. 19. As will be apparent to those skilled in the art, in both cases the ceramic/glass substrate 12 is fired to either sinter it or to cause the materials disposed on it to adhere to it. When such firing occurs, the frit in layers 224 melts and reforms as glass. Thus, after such firing, the ceramic colorant image 20 of FIG. 1, and the frosting ink image 222 of FIG. 19, are disposed between two glass layers.

Thus, e.g., FIG. 19 depicts a coated ceramic/glass substrate 301 which is similar to the coated substrate assembly 10 (see FIG. 1) but differs therefrom in having a covercoat 213/frosting ink image 222/covercoat layer 213 disposed over the substrate 12.

Thus, e.g., other structures may be formed in which, e.g., the frosting ink image 222 is disposed between two glass layers. By way of illustration, and in the process depicted in FIG. 20, one may print a frosting ink image 222 onto a thermoplastic substrate 302 with the use of a ribbon 200, 210, 211, and/or 215. One may use a substrate such as, e.g., a sheet of biaxially oriented poly(ethyelene terephthalate), a sheet of polyvinyl chloride, a sheet of polycarbonate, etc. The digitally printed thermoplastic substrate may then be attached to a first pane of ceramic of glass material and, thereafter, the assembly thus formed may be attached to a second pane of ceramic or glass material to form a ceramic (glass)/thermoplastic sheet/ceramic(glass) laminate structure.

FIG. 21 discloses a structure 305 in which the coated flexible substrate 303 is attached to a ceramic/glass substrate 12. It is preferred not to fire this structure, because the gases evolved from the flexible substrate layer 302 may degrade the frosting ink layer 305.

FIG. 22 depicts a laminated structure 307 in which the assembly 303 is sandwiched between two ceramic/glass substrates 12 to form a laminated structure.

FIG. 23 shows a structure which is similar to that of FIG. 21 but, unlike the structure of FIG. 1, can be fired without substantially degrading the structural integrity of frosting ink image 222.

A Process for Making a Ceramic Decal Assembly

FIG. 24 is a flow diagram of one preferred process of the invention. Referring to the process depicted in FIG. 24, and in step 400 thereof, a decal is prepared which can thereafter be adhesively attached to a ceramic/glass substrate.

The decal to be prepared is preferably a digitally printed decal whose preparation is described elsewhere in this specification. One may prepare any of the ceramic decals described elsewhere in this specification.

Thus, by way of illustration, and referring to FIGS. 25A and 25B, one may prepare ceramic decal 401 and/or ceramic decal 402. When these embodiments are used, it is preferred that they comprise, in one preferred aspect of this embodiment, an "ethocel coated heat transfer paper." This term as used herein refers to heat transfer paper, i.e., commercially available paper with a wax coating possessing a melt point in the range of from about 65 to about 85 degrees Centigrade which is coated with a layer of ethylcellulose which, in one embodiment, is about 10 grams/square meter thick. Such heat transfer paper is discussed, e.g., in U.S. Pat. Nos. 6,126,669, 6,123,794, 6,025,860, 5,944,931, 5,916,399, 5,824,395, 5,032,449, and the like. The entire disclosure of each of these United States patents is hereby incorporated by reference into this specification.

As will be apparent, what each of decals 401 and 402 have in common is a substrate 226. This substrate 226, which is typically paper, is described elsewhere in the specification. However, this substrate may be any type of flat, thin, flexible sheet, for example, polyester or polyolefin films, non-woven sheets and the like. The substrate for the decal should first be coated with a wax/resin release layer and then a covercoat layer which has also been described elsewhere in this specification. The covercoated substrate should have the characteristics of being able to receive a thermally printed digital image from the various thermal transfer ribbons described elsewhere in this specification. After printing onto such coated substrates, a ceramic decal is formed. A further characteristic of the these decals is that, after the decal has been attached to the glass or ceramic substrate, the substrate on which the decal was formed must be able to be cleanly separated from the image. This separation should occur between the wax/resin release layer and the covercoat such that the covercoat and the image remain entirely on the glass and ceramic substrate.

As will also be apparent, each of the decals 401 and 402 has a wax release layer 36 in common. This wax release layer 36 preferably has a thickness of from about 0.2 to about 2.0 microns and comprises at least about 50 weight percent of wax.

As will also be apparent, each of the decals 401 and 402 also comprise a transferable covercoat layer 242. In one embodiment, the transferable covercoat layer 242 is comprised of ethylcellulose. Such a covercoat is prepared by dissolving 12 grams of ethylcellulose with a mixture of 16.4 grams of isopropyl alcohol, 68.17 grams of toluene, and 3.42 grams of dioctyl pthalate that has been heated to 50 degrees Celsius. This solution thus formed is then applied to a wax/resin coated substrate with a Meyer rod to achieve a coating weight of about 10 grams/square meter. Thus, e.g., the transferable covercoat layer 242 may have the same composition as covercoat layer 224 (see FIG. 14) and/or covercoat layer 24. In this embodiment, covercoat layer 242 is comprised of at least about 25 weight percent of thermoplastic material with an elongation to break of greater than about 2 percent. In one embodiment, the covercoat layer 242 is comprised of at least about 50 weight percent of thermoplastic material with an elongation to break of greater than 2 percent. In another embodiment, the covercoat layer 242 is comprised of thermoplastic material with an elongation to break greater than 5 percent.

In each of the decals 401 and 402, disposed above the transferable covercoat layer 242 is either a frosted ink image 222 (decal 401), or a ceramic colorant image 20. As will be apparent, what each of these image layers has in common with the other is the presence of either opacification particles or colorant particles that have a particle size distribution such that at least about 90 weight percent of such particles are within the range of from about 0.2 to about 20 microns. In addition, both of these images must be comprised of film forming glass flux. The aforementioned opacification particles or colorant particles must have a refractive index of at least about 0.1 and preferably 0.2 units different from the refractive index of the film forming glass flux used in the image. In addition, the aforementioned opacification particles or colorant particles as well as the glass flux must be non-carbonaceous in their combination and essentially inorganic such that they remain on the glass or ceramic substrate after firing. Both of these images must also have the capability to alter the visual appearance of the glass or ceramic substrates, in an image-wise fashion, after the substrates have been fired to visually reveal the intended decoration of said substrates.

Referring again to FIG. 24, and in step 410 thereof, a pressure sensitive transfer adhesive assembly is prepared. As is indicated in FIG. 26, the pressure sensitive transfer adhesive assembly is comprised of pressure sensitive transfer adhesive. These adhesives, and assemblies comprising them, are well known to those in the art. Reference may be had, e.g., to U.S. Pat. Nos. 5,319,475, 6,302,134, reissue U.S. Pat. Nos. 37,036, 6,063,589, 5,623,010, 5,059,964, 5,602,202, 6,284,338, 6,134,892, 5,931,000, and the like. Reference may be had, e.g., to U.S. patent application Ser. Nos. 20010001060A1, 20020015836A1, and the like. Reference may be had to international patent publications EP0530267B1, EP0833965B1, EP0833866B1, WO9700922A1, WO9700913A1, EP0576530B2, and the like. The entire disclosure of each of these patent publications is hereby incorporated by reference into this specification.

Pressure sensitive adhesives are also described at, e.g., pages 724–735 of Irving Skeist's "Handbook of Adhesives," Second Edition (Van Nostrand Reinhold Company, New York, N.Y., 1977). These adhesives are often composed of a rubbery type elastomer combined with a liquid or solid resin tackifier component.

Pressure-sensitive acrylic adhesives are often used. The acrylate pressuresensitive adhesives are often a copolymer of a higher alkyl acrylate, such as, e.g., 2-ethylehexyl acrylate copolymerized with a small amount of a polar comonomer. Suitable polar comonomers include, e.g., acrylic acid, acylamide, maleic anhydride, diacetone acrylaminde, and long chain alkyl acrylamides.

In one preferred embodiment, the pressure sensitive transfer adhesive is an acrylic pressure sensitive transfer adhesive. These adhesives are also well known. Reference may be had, e.g., to U.S. Pat. No. 5,623,010 (acrlate-containing polymer blends and methods of using), U.S. Pat. Nos. 5,605,964, 5,602,202 (methods of using acrylate-containing polymer blends), U.S. Pat. Nos. 6,134,892, 5,931,000, 5,677,376 (acrylate-containing polymer blends), U.S. Pat. No. 5,657,516, and the like. The entire disclosure of each of these United States patents is hereby incorporated by reference into this specification.

One suitable pressure sensitive transfer adhesive assembly is sold as "Arclad 7418" by Adhesives Research, Inc. of 400 Seaks Run oad, Glen Rock, Penn. This assembly is comprised of an acrylic adhesive and a densified kraft liner.

Other laminating adhesive assemblies also may be used in the process of this invention. Reference may be had, e.g., to U.S. Pat. No. 5,928,783 (pressure sensitive adhesive compositions), U.S. Pat. Nos. 5,487,338, 5,339,737, and the like. Reference may also be had to European patent publications EP0942003A1, EP0684133B1, EP0576128A1, and the like.

Referring again to FIG. 26, and in the preferred embodiment depicted therein, the pressure sensitive adhesive assembly 410 is comprised of pressure sensitive adhesive 412, silicone release coating 413, transfer substrate 414, and silicone release coating 415. The adhesive assembly 410 preferably has a thickness 416 of less than about 100 microns, preferably being from about 1 to about 20 microns thick. More preferably, the adhesive assembly 410 has a thickness 416 from about 0.1 to about 2 microns thick.

In one embodiment, the pressure sensitive transfer adhesive is comprised of at least 95 weight percent of carbonaceous material and less than about 5 weight percent of inorganic material.

Referring again to FIG. 24, and in step 420 of the process, the decal provided in step 400 and the pressure-sensitive transfer adhesive assembly provided in step 410 are pressure laminated to form a composite laminated structure (see FIG. 27). This pressure lamination process is well known to those skilled in the art. Reference may be had, e.g., to U.S. Pat. Nos. 6,120,882, 5,866,236, 5,656,360, 5,100,181, 5,124,187, 6,270,871, 5,397,634, and the like. The entire disclosure of each of these United States patents is hereby incorporated by reference into this specification.

In the preferred embodiment depicted in FIG. 27, the composite assembly is pressure laminated with pressure rollers 425, preferably using a light pressure of less than about 1 pound per square inch. It is preferred to remove substantially all air and/or other gases between adjacent contiguous surfaces in this process.

Referring again to FIG. 24, and in step 430 thereof, the release paper (comprised of the transfer substrate 414, with silicone release coatings 413/415 on its opposed surfaces) is stripped away from the pressure sensitive adhesive 412 to form a pressure-sensitive adhesive decal. This process step 430 is schematically illustrated in FIG. 28.

Referring again to FIG. 24, and in step 440 thereof, the pressure sensitive adhesive decal is laminated to either a glass or a ceramic substrate with light pressure (less than about 1 pound per square inch) by pressure lamination; reference may be had to FIG. 29, wherein this step 440 is schematically illustrated. This step 440 will leave the paper 226 and the wax release layer 36 indirectly attached to the glass or ceramic substrate 12. Alternatively, the glass or ceramic article may be directly coated or laminated with a pressure sensitive adhesive. Such an article may then be directly laminated to the decal as in Step 440, eliminating Steps 420 and 430.

Thereafter, and referring again to FIG. 24, in step 450 the wax/resin coated paper or substrate 226 is peeled away from the covercoat 242 of the ceramic decal assembly. The assembly that remains after this step is illustrated in FIG. 31.

The assembly depicted in FIG. 31 is comprised of a frosted ink image 222. As will be apparent, this will be obtained when decal 401 is used (see FIG. 25A). When decal 402 is used (see FIG. 25B), a ceramic colorant image 20 will be obtained.

Referring again to FIG. 24, and in step 460 of the process depicted, the ceramic/glass assembly is then fired to burn off substantially all of the carbonaceous material in the assembly. In general, the assembly is subjected to a temperature of from at least about 350 degrees Centigrade for at least about 5 minutes.

Thereafter, in step 470 of the process (see FIG. 24), the fired substrate is measured to determine its optical quality. The optical quality of a fired substrate may be determined, e.g., by comparing the optical density of the image on the fired substrate with the optical density of the image on the unfired substrate.

Applicants' process unexpectedly produces a fired product whose optical properties are substantially as good as, if not identical to, the optical properties of the unfired product.

As is illustrated in FIG. 32, the unfired substrate assembly 473 is analyzed by optical analyzer 471. Thereafter, the fired substrate assembly 475 is analyzed by optical analyzer 471.

The optical properties of the fired substrate 475 are preferably at least about 80 percent as good as the optical properties of the unfired substrate 473.

In one embodiment, a pattern recognition algorithm (not shown) is used to compare the unfired image on assembly 473 to the fired image on assembly 475. The use of pattern recognition algorithms for the purpose is well known. Reference may be had, e.g., to U.S. Pat. No. 6,278,798 (image object recognition), U.S. Pat. Nos. 6,275,559, 6,195,475, 6,128,561, 5,024,705, 6,017,440, 5,838,758, 5,264,933, 5,047,952, 5,040,232, 5,012,522 (automated face recognition), and the like. The entire disclosure of each of these United States patents is hereby incorporated by reference into this specification.

One or more matching algorithms may be used to compare these optical qualities. These algorithms, and their uses, are well known. See, e.g., U.S. Pat. No. 6,041,137 (handwriting definition), U.S. Pat. Nos. 5,561,475, 5,961,454, 6,130,912, 6,128,047, 5,412,449, 4,955,056 (pattern recognition system), U.S. Pat. Nos. 6,031,980, 5,471,252, 5,875,108, 5,774,357, and the like. The entire disclosure of each of these United States patents is hereby incorporated by reference into this specification.

In one embodiment, illustrated in FIG. 32, when the substrate 12 is a clear substrate (such as, e.g., glass), one may measure and compare the transmission density of the unfired and fired optical images by means of, e.g., a densitometer. In another embodiment, illustrated in FIG. 32, when the substrate 12 is an opaque substrate, one may measure and compare the reflection density of the unfired and fired optical images by means of, e.g., a densitometer. Such uses of a densitometer are well known. Reference may be had, e.g., to U.S. Pat. No. 3,614,241 (automatic recording densitometer which simultaneously determines and records the optical density of a strip of photographic film), U.S. Pat. Nos. 5,525,571, 5,118,183, 5,062,714, and the like. The entire disclosure of each of these United States patents is hereby incorporated by reference into this specification.

Referring again to FIG. 32, and in particular to fired assembly 475, it will be seen that, in the embodiment depicted, in areas 477, 479, 481, and 483 some or all of the image has been eroded during the firing. Without wishing to be bound by any particular theory, applicants believe that this erosion can occur when gases are formed during the firing and disrupt the layer 22 as they escape from the fired assembly.

Regardless of the cause of such erosion, its existence damages the optical properties of the fired substrate. The process of the instant invention produces a product in which such erosion is substantially absent.

The following examples are presented to illustrate the claimed invention but are not to be deemed limitative thereof. Unless otherwise specified, all parts are by weight, and all temperatures are in degrees Centigrade.

EXAMPLE 1

A 4.5 micron thick poly (ethylene terephthalate) film (Toray F31) was used as a substrate film, and it was backcoated with a polydimethylsiloxane-urethane copolymer SP-2200 crosslinked with D70 toluene diisocyanate prepolymer (both of which were sold by the Advanced Polymer Company of New Jersey) at a coat weight of 0.03 grams per square meter. The copolymer composition was applied with a Myer Rod and dried in an oven at a temperature of 50 degrees Centigrade for 15 seconds.

A release coating composition was prepared for application to the face coat of the polyester film. A first mixture, mixture #1, was prepared by dissolving 3.5 grams of Therban LT 2157 (a acrylonitile butadiene rubber sold by The Bayer Corporation of Morristown, N.J.) into 46.5 grams of toluene that had been heated to a temperature of 70 degrees Centigrade. A second mixture, mixture #2, was then prepared by adding 12.62 grams of Polywax 850 (a polyethylene wax sold by Baker Hughes Petrolite Company of Sugarland, Tex.) to 71.51 grams of toluene; the composition thus produced was mixed with 50 grams of ceramic grinding media and milled on a paint shaker for 15 minutes until substantially all of the particles were smaller than 10 microns. A third mixture, mixture #3, was prepared by heating 23.72 grams of toluene to a temperature of 70 degrees Centigrade, then adding 3.78 grams of Evaflex 577 (an ethylene-vinylacetate resin sold by DuPont Mitsui and Polychemicals Company of Japan) until dissolved, then adding 4.62 grams of Ceramer 1608 (a alpha-olefinic wax sold by Baker Hughes Petrolite Company of Sugarland, Tex.), then mixing until fully dissolved, and then reducing the temperature of the mixture #3 to 50 degrees Centigrade. Finally, an ink was prepared by adding 23.74 grams of mixture #1 and 32.12 grams of Mixture #3 to Mixture #2. Thereafter the mixture so produced was filtered to separate the filtrate from the grinding media, and the filtrate was then coated onto the release layer of the polyester substrate at a coating weight of 0.75 grams per square meter using a Meyer Rod. The coated substrate thus produced was then dried with hot air.

The polyester film, with its backcoating and release coating, then was coated with a frosted ink layer at a coating weight of 5.6 grams per square meter; the frosted ink layer was applied to the release layer. The frosted ink was prepared by mixing 60.0 grams of hot toluene (at a temperature of 60 degrees Centigrade) with 14.73 grams of a mixture of Dianal BR 106 and Dianal BR 113 binders in weight/weight ratio of 1/3; these binders were purchased from the Dianal America Company of Pasadena, Tex. Thereafter, 3.99 grams of dioctyl pthalate (sold by Eastman Chemical, Kingsport, Tenn.), 48.8 grams of Unleaded Glass Flux 23901 (sold by Johnson Matthey Ceramic Inc. of Downington, Pa.) with a refractive index of 1.4, 9.04 grams of Onglaze Unleaded Glass Flux 94C1001 (sold by Johnson Matthey Ceramic Inc. of Downington, Pa.) with a refractive index of 1.7, 8.17 grams of Superpax Zircon Opacifier (sold by Johnson Matthey Ceramic Inc. of Downington, Pa.) with a refractive index of 1.9, 8.17 grams of Cantal 290 (sold by Canada Talc, Marmora, Ontario, Canada), and 1.59 grams of Cerdec 1795 Black Oxide (sold by Cerdec-DMC$^2$, Washington, Pa.) were charged to the mixture. The composition thus produced was mixed with 50 grams of ceramic grinding media and milled on a paint shaker for 15 minutes until substantially all of the particles were smaller than 10 microns. Thereafter, 5.48 grams of Unilin 425 (a wax sold by the Baker Hughes Baker Petrolite Company) were dissolved in sufficient reagent grade methylethylketone to prepare a 15 percent solution, and this wax solution was then charged to the mixture with stirring, until a homogeneous mixture was obtained. Thereafter the mixture was filtered to separate the filtrate from the grinding media, and the filtrate was then coated onto the release layer of the polyester substrate at a coating weight of 5.6 grams per square meter using a Meyer Rod. The coated substrate thus produced was then dried with a hot air gun.

A covercoated backing sheet was prepared by coating a 12% solution of ethylcellulose (supplied by Dow Chemical of Midland Mich.) in toluene onto a heat transfer backing sheet (supplied by Brittains Papers, Stokes-on-Trent, United Kingdom) with a Meyer Rod to achieve a dry coating weight of 10.0 grams per square meter. The coating was dried with a hot air gun.

Thereafter a rectangular, solid fill image was printed onto the covercoated backing sheet with the frosting ribbon using a Zebra 140xi printer at an energy setting of 22 and a print speed of 10 centimeters per second to prepare a frosting ink decal.

The frosting ink image was then transferred to a sheet of borosilicate glass (10 centimeters×10 centimeters×0.5 centimeters) by pressing the frosting ink decal against the glass sheet and heating this composite up to a temperature of 121 degrees Centigrade. The backing sheet was then peeled away from the glass sheet, leaving the frosting ink image on the glass. The glass and frosting ink image were then fired in a kiln for 20 minutes at 340 degrees Centigrade. This thermal treatment caused the carbonaceous binder in the frosting image to burn away, leaving the mixture of film forming glass frit and opacifying agents on the glass sheet. The heat of the kiln also caused the film forming glass frit to melt and flow into a film on the surface of the glass sheet. The opacifying agents remained dispersed in this film, thus rendering the film translucent yet not transparent.

The frosting ink image was then characterized for whiteness and opacity. The test for determining opacity was carried out according to the Tappi Standard T519. The measurements were taken on fired glass samples. The whiteness was calculated according to CIE Lab color space measurement standard of 1976 with a D65 illuminate and a 10 degree observation angle.

In the experiment of this example, the combination of Unleaded Glass Flux with a refractive index of 1.4, Onglaze Unleaded Glass Flux with a refractive index of 1.7 and Superpax Zircon Opacifier with a refractive index of 1.9 was fired into a frosting image on the glass sheet with an opacity value of 52 and a whiteness of 20.06 delta L*.

EXAMPLE 2

A pressure sensitive adhesive was prepared from a 20 percent solution of an acrylic polymer, Dianal BR106 (a methyl n-butyl methacrylate copolymer, supplied by Dianal America, Pasadena, Tex.) in toluene was prepared. To 100 grams of this solution was added 10 grams of dioctyl pthalate (sold by Eastman Chemical of Kingsport, Tenn.). This solution was then coated onto a glass substrate using a Meyer rod at a coatweight of 3.98 grams per square meter to form a pressure sensitive adhesive coated glass substrate.

A decal was then prepared as described in accordance with the procedure of Example 1. This decal was then placed face side down onto the pressure sensitive adhesive coated glass substrate(10 centimeters×10 centimeters×0.5 centimeters). Pressure was applied at 1 pound per square inch to the backside of the decal for 15 seconds to affix the decal to the glass substrate. The backing sheet was then peeled away from the glass sheet, leaving the frosting ink image and associated covercoat affixed to the glass. The glass and frosting ink image were then fired in a kiln for 20 minutes at 340 degrees Centigrade. This thermal treatment caused the carbonaceous binder in the frosting image to burn away, leaving the mixture of film forming glass frit and opacifying agents on the glass sheet.

The opacity of the unfired decal assembly was 38.23. The opacity of the fired decal assembly was 38.22, being substantially unchanged

EXAMPLE 3

The procedure of Example 2 was substantially followed, with the exception that the glass substrate was coated with the same acrylic pressure sensitive adhesive solution using a meyer rod to achieve a coatweight of 16.34 grams per square meter.

A decal was prepared, attached to the pressure sensitive adhesive coated glass substrate and fired essentially in the same fashion as described in Example #2. The opacity of the unfired decal assembly was 38.67. The opacity of the fired decal assembly was 38.18

COMPARATIVE EXAMPLE 4

The procedure described in the Example 2 was substantially followed, with the exception that a pressure sensitive adhesive was prepared from a 20 percent solution of a hydrogenated acrylonitrile-butadiene rubber thermoplastic rubber, Kraton FG1924X (supplied by Shell Oil Company of Houston, Tex.) in toluene.

To 100 grams of this thermoplastic rubber solution was added 10 grams of dioctyl pthalate (sold by Eastman Chemical of Kingsport, Tenn.). This solution was then coated onto a glass substrate using a Meyer rod to achieve a coatweight of 11.48 grams per square meter.

A decal was prepared, attached to the pressure sensitive adhesive coated glass substrate and fired essentially in the same fashion as described in Example #2.

The opacity of the unfired decal was 38.55. The opacity of the fired decal was 23.28. The significant loss in opacity was a direct result of voiding and the loss of etching ink image material exposing the clear glass substrate.

EXAMPLE 5

The procedure of Example 4 was substantially followed with the exception that the pressure sensitive adhesive was coated onto the glass substrate at a higher coatweight of 16.23 grams per meter square.

A decal was prepared, attached to the pressure sensitive adhesive coated glass substrate and fired essentially in the same fashion as described in Example #2. The opacity of the unfired decal assembly was 38.88. The opacity of the fired decal assembly was 24.88.

It is to be understood that the aforementioned description is illustrative only and that changes can be made in the apparatus, in the ingredients and their proportions, and in the sequence of combinations and process steps, as well as in other aspects of the invention discussed herein, without departing from the scope of the invention as defined in the following claims.

We claim:

1. A ceramic decal assembly comprised of a substrate, a layer of adhesive contiguous with said substrate, and a ceramic decal contiguous with said layer of adhesive, wherein:
   (a) said substrate is selected from the group consisting of a glass substrate, a ceramic substrate, and a glass-ceramic substrate;
   (b) said layer of adhesive is comprised of pressure sensitive adhesive, has a thickness of less than about 100 microns, and is comprised of at least about 95 weight percent of carbonaceous material;
   (c) said ceramic decal is comprised of a wax release layer, a transferable covercoat layer, and an image layer, wherein:
      1. said wax release layer has a thickness of from about 0.2 to about 2.0 microns and comprises at least about 50 weight percent of wax,
      2. said transferable covercoat layer is comprised of at least 25 weight percent of thermoplastic material with an elongation to break of greater than about 2 percent,
      3. said image layer is comprised of particles selected from the group consisting of opacification particles, colorant particles, and mixtures thereof, wherein said particles have a particle size distribution such that at least 90 weight percent of such particles are within the range of from about 0.2 to about 20 microns, and
      4. said image layer is comprised of film forming glass flux, and
   (d) after said ceramic decal assembly has been subjected to a temperature of at least about 350 degrees Centigrade for at least about 5 minutes, said ceramic decal has an image with an optical quality that corresponds substantially with the optical quality of said ceramic decal assembly prior to the time it has been subjected to said temperature of at least about 350 degrees Centigrade for at least about 5 minutes.

2. The ceramic decal assembly as recited in claim 1, wherein after said layer of adhesive is comprised of an pressure sensitive adhesive, having a thickness of less than about 100 microns, and is comprised of a acrylic polymer.

3. The ceramic decal assembly as recited in claim 2, wherein after said ceramic decal assembly has been subjected to a temperature of at least about 350 degrees Centigrade for at least about 5 minutes, said ceramic decal has an image with an optical density that is at least about 80 percent of the optical density of said ceramic decal assembly prior to the time it has been subjected to said temperature of at least about 350 degrees Centigrade for at least about 5 minutes.

4. The ceramic decal assembly as recited in claim 3, wherein said transferable covercoat layer is comprised of at least 50 weight percent of said thermoplastic material.

5. The ceramic decal assembly as recited in claim 4, wherein said thermoplastic material has an elongation to break of at least about 5 weight percent.

6. The ceramic decal assembly as recited in claim 5, wherein said image layer is comprised of film-forming glass flux.

7. The ceramic decal assembly as recited in claim 6, wherein said film-forming glass flux has a melting temperature of greater than about 550 degrees Centigrade.

8. The ceramic decal assembly as recited in claim 7, wherein said image layer is a frosting image layer.

9. The ceramic decal assembly as recited in claim 8, wherein said frosting image layer is comprised of said opacification particles.

10. The ceramic decal assembly as recited in claim 9, wherein said opacification particles have a first refractive index, and such film-forming glass flux has a second refractive index, such that the difference between said first refractive index and said second refractive index is plus or minus 0.1.

11. The ceramic decal assembly as recited in claim 10, wherein said opacification particles have a first melting point, and said film-forming glass flux has a second melting point, such that said first melting point exceeds said second melting point by at least about 100 degrees Centigrade.

12. The ceramic decal assembly as recited in claim 11, wherein said opacification particles have a first concentration in said frosting image layer, and said film-forming glass flux has a second concentration in said frosting image layer, and the ratio of said first concentration to said second concentration is no greater than about 1.25.

13. The ceramic decal assembly as recited in claim 12, wherein said first refractive index exceeds said second refractive index by at least about 0.2.

14. The ceramic decal assembly as recited in claim 6, wherein said film-forming glass flux is present in said image layer at a concentration of from about 35 to about 75 weight percent.

15. The ceramic decal assembly as recited in claim 5, wherein said image layer is comprised of from about 20 to about 40 weight percent of solid, volatilizable carbonaceous binder.

16. The decal assembly as recited in claim 1, wherein said colorant particles are metal oxide colorant particles.

17. A process of forming a decorated ceramic substrate comprising the steps of adhesively attaching a ceramic decal assembly to a ceramic substrate with a pressure sensitive adhesive to form a decorated ceramic substrate, and thereafter firing such decorated ceramic substrate to remove substantially all of the carbonaceous material in such decorated ceramic substrate and to fix an image onto said substrate, wherein:
- (a) said substrate is selected from the group consisting of a glass substrate, a ceramic substrate, and a glass-ceramic substrate;
- (b) said layer of adhesive is comprised of pressure sensitive adhesive with a thickness of less than about 100 microns, is comprised of at least about 95 weight percent of carbonaceous material, and is used to attach said ceramic decal to said substrate;
- (c) said ceramic decal is comprised of a flexible substrate coated with a wax release layer, a transferable covercoat layer, and an image layer, wherein:
  1. said wax release layer has a thickness of from about 0.2 to about 2.0 microns and comprises at least about 50 weight percent of wax,
  2. said transferable covercoat layer is comprised of at least 25 weight percent of thermoplastic material with an elongation to break of greater than about 2 percent,
  3. said image layer is comprised of particles selected from the group consisting of opacification particles, colorant particles, and mixtures thereof, wherein said particles have a particle size distribution such that at least 90 weight percent of such particles are within the range of from about 0.2 to about 20 microns, and
  4. said image layer is comprised of film forming glass flux, and
- (d) said flexible substrate and wax release layer is separated from said covercoat, image layer, adhesive and substrate.

18. The process as recited in claim 17, wherein said covercoat, said image layer, said adhesive and said substrate are subjected to a temperature of at least about 350 degrees Centigrade for at least about 5 minutes to form said decorated ceramic substrate such that optical quality decorated ceramic substrate corresponds substantially with the optical quality of said adhesively affixed ceramic image prior to the time the assembly has been subjected to said temperature of at least about 350 degrees Centigrade for at least about 5 minutes.

19. The process as recited in claim 17, wherein said adhesive is a pressure senisitive transfer adhesive formed on releasable, flexible substrate, wherein:
- (a) said transfer adhesive is first attached to said ceramic decal assembly with pressure,
- (b) said releasable, flexible substrate is then detached from said ceramic decal assembly, exposing the other side of said pressure sensitive transfer adhesive, and
- (c) the other side of said pressure sensitive transfer adhesive is then used to attach said ceramic decal assembly to said ceramic substrate.

* * * * *